(12) United States Patent
Burns et al.

(10) Patent No.: US 10,845,131 B2
(45) Date of Patent: Nov. 24, 2020

(54) STEAM GENERATION

(71) Applicant: Clean Thermodynamic Energy Conversion Ltd, Newhaven (GB)

(72) Inventors: Michael Alan Burns, Seaford (GB); Paul Andrew Burns, Seaford (GB)

(73) Assignee: Clean Thermodynamic Energy Conversion Ltd, New Haven (GB)

( * ) Notice: Subject to any disclaimer, the term of this patent is extended or adjusted under 35 U.S.C. 154(b) by 633 days.

(21) Appl. No.: 14/447,748

(22) Filed: Jul. 31, 2014

(65) Prior Publication Data

US 2015/0121875 A1    May 7, 2015

Related U.S. Application Data

(63) Continuation of application No. PCT/GB2013/000040, filed on Jan. 31, 2013.

(30) Foreign Application Priority Data

Jan. 31, 2012 (GB) .................................. 1201669.7
Jan. 31, 2012 (GB) .................................. 1201670.5
(Continued)

(51) Int. Cl.
  *F28F 1/24*    (2006.01)
  *B23K 1/00*    (2006.01)
  (Continued)

(52) U.S. Cl.
  CPC .............. *F28F 1/24* (2013.01); *B23K 1/0012* (2013.01); *B23P 15/26* (2013.01); *F01K 13/00* (2013.01);
  (Continued)

(58) Field of Classification Search
  CPC .................................... F22G 1/02; F28F 1/24
  (Continued)

(56) References Cited

U.S. PATENT DOCUMENTS

| | | |
|---|---|---|
| 1,617,519 A | 6/1921 | Hartmann |
| 1,559,949 A | 1/1922 | Feldmeier |
| | (Continued) | |

FOREIGN PATENT DOCUMENTS

| | | |
|---|---|---|
| CN | 201547745 U | 8/2010 |
| CN | 102080818 A | 6/2011 |
| | (Continued) | |

OTHER PUBLICATIONS

International Search Report for corresponding International App. No. PCT/GB2013/000040 dated Oct. 11, 2013.

*Primary Examiner* — Steven B McAllister
*Assistant Examiner* — Benjamin W Johnson
(74) *Attorney, Agent, or Firm* — Renner, Otto, Boisselle & Sklar, LLP

(57) ABSTRACT

A steam generator for generating a superheated fluid from a working fluid using a stream of heated gas, the steam generator comprising: a housing, which defines a gas flow path having an inlet at one, upstream end thereof into which a stream of heated gas is delivered and an outlet at the other, downstream end thereof; and a steam generation module which is disposed within the gas flow path of the housing, the steam generation module comprising a heat exchanger which receives a working fluid and is operative to raise the temperature of the working fluid to provide a saturated fluid, and a superheater which receives the saturated fluid from the heat exchanger and is operative to raise the temperature of the saturated fluid and provide a supersaturated fluid.

21 Claims, 38 Drawing Sheets

(30) Foreign Application Priority Data

Figure 1A:
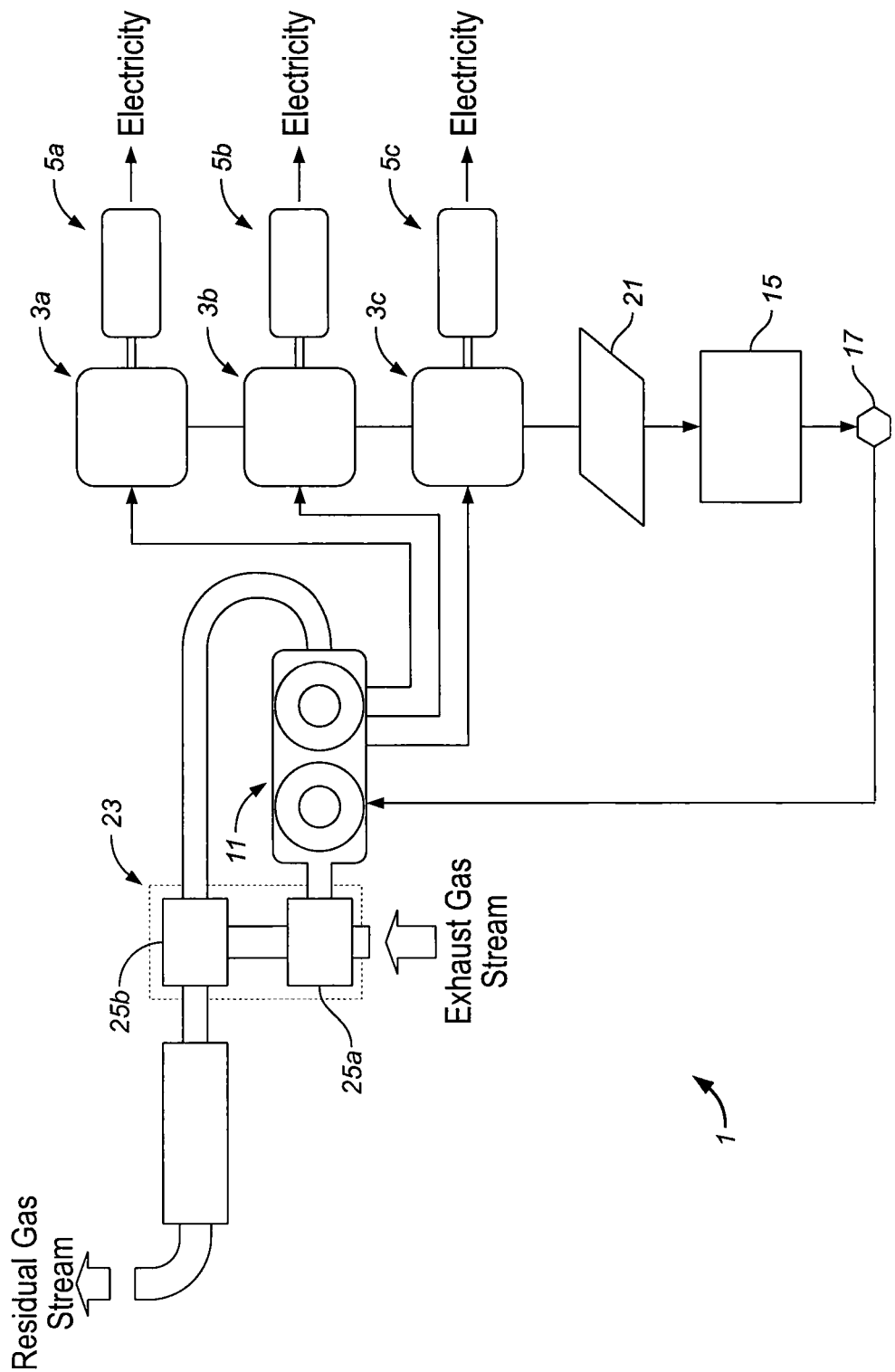

| Jan. 31, 2012 | (GB) | 1201671.3 |
|---|---|---|
| Jan. 31, 2012 | (GB) | 1201672.1 |
| Jan. 31, 2012 | (GB) | 1201673.9 |
| Jan. 31, 2012 | (GB) | 1201674.7 |
| Jan. 31, 2013 | (WO) | PCT/GB2013/000039 |

(51) Int. Cl.

| F28F 9/013 | (2006.01) |
|---|---|
| F28D 7/02 | (2006.01) |
| F28D 7/06 | (2006.01) |
| F22B 1/18 | (2006.01) |
| F22B 37/10 | (2006.01) |
| F22G 1/00 | (2006.01) |
| F22G 1/16 | (2006.01) |
| F22G 3/00 | (2006.01) |
| F28F 9/26 | (2006.01) |
| F28F 1/32 | (2006.01) |
| F28D 7/16 | (2006.01) |
| B23P 15/26 | (2006.01) |
| F01K 13/00 | (2006.01) |
| F22G 1/02 | (2006.01) |

(52) U.S. Cl.
CPC .............. *F22B 1/18* (2013.01); *F22B 37/101* (2013.01); *F22G 1/00* (2013.01); *F22G 1/02* (2013.01); *F22G 1/16* (2013.01); *F22G 3/002* (2013.01); *F28D 7/024* (2013.01); *F28D 7/06* (2013.01); *F28D 7/1623* (2013.01); *F28F 1/32* (2013.01); *F28F 9/013* (2013.01); *F28F 9/26* (2013.01); *Y10T 29/4938* (2015.01); *Y10T 29/49378* (2015.01)

(58) Field of Classification Search
USPC ................ 122/1 R, 1 B, 460, 461, 466, 468
See application file for complete search history.

(56) References Cited

U.S. PATENT DOCUMENTS

| 1,561,013 | A | | 12/1923 | Odendahl | |
|---|---|---|---|---|---|
| 1,768,222 | A | | 12/1928 | Uhde | |
| 1,776,135 | A | | 9/1930 | Smith | |
| 1,925,646 | A | | 11/1930 | Rakestraw | |
| 1,943,557 | A | | 6/1932 | Ruthenburg et al. | |
| 2,212,542 | A | | 2/1938 | Jones | |
| 2,342,616 | A | | 11/1941 | O'Brien | |
| 3,397,741 | A | | 8/1968 | Gunter | |
| 3,430,692 | A | * | 3/1969 | Karmazin | F28D 1/05316 165/134.1 |
| 3,687,194 | A | | 8/1972 | Schöll | |
| 4,054,107 | A | * | 10/1977 | Horlitz, Jr. | F22B 1/1861 122/7 B |
| 4,142,581 | A | | 3/1979 | Yoshitomi | |
| 4,382,379 | A | | 5/1983 | Kelly | |
| 4,529,212 | A | | 7/1985 | Beckmann | |
| 4,602,500 | A | | 7/1986 | Kelly | |
| 5,277,849 | A | * | 1/1994 | Morton | F24F 6/18 261/118 |
| 5,626,103 | A | * | 5/1997 | Haws | F01K 17/025 122/1 R |
| 5,787,844 | A | | 8/1998 | Paju | |
| 6,019,070 | A | | 2/2000 | Duffy | |
| 6,158,221 | A | * | 12/2000 | Fancher | F01K 25/065 60/649 |
| 6,367,313 | B1 | | 4/2002 | Lubyk | |
| 2002/0026906 | A1 | * | 3/2002 | Franke | F22B 21/346 122/460 |
| 2003/0000686 | A1 | | 1/2003 | Kester | |
| 2005/0194120 | A1 | | 9/2005 | Lomax et al. | |
| 2007/0084418 | A1 | * | 4/2007 | Gurevich | F22B 1/1815 122/1 B |
| 2007/0163764 | A1 | | 7/2007 | Kaga et al. | |
| 2008/0000619 | A1 | | 1/2008 | Zhou et al. | |
| 2009/0145587 | A1 | | 6/2009 | Young et al. | |
| 2010/0044023 | A1 | * | 2/2010 | Canales | F28D 1/0477 165/178 |
| 2010/0051247 | A1 | | 3/2010 | Sogabe et al. | |

FOREIGN PATENT DOCUMENTS

| DE | 741418 | | 11/1943 |
|---|---|---|---|
| DE | 2552690 | A | 6/1977 |
| DE | 3918610 | A | 12/1990 |
| DE | 4042057 | A | 1/1991 |
| FR | 2670572 | A | 6/1992 |
| GB | 303172 | | 11/1929 |
| GB | 991914 | | 5/1965 |
| GB | 1309900 | | 3/1973 |
| GB | 2102966 | A | 2/1983 |
| JP | 58/190698 | A | 11/1983 |
| JP | 58/209436 | A | 12/1983 |
| JP | 60/194291 | A | 10/1985 |
| RO | 113392 | B1 | 6/1998 |

\* cited by examiner

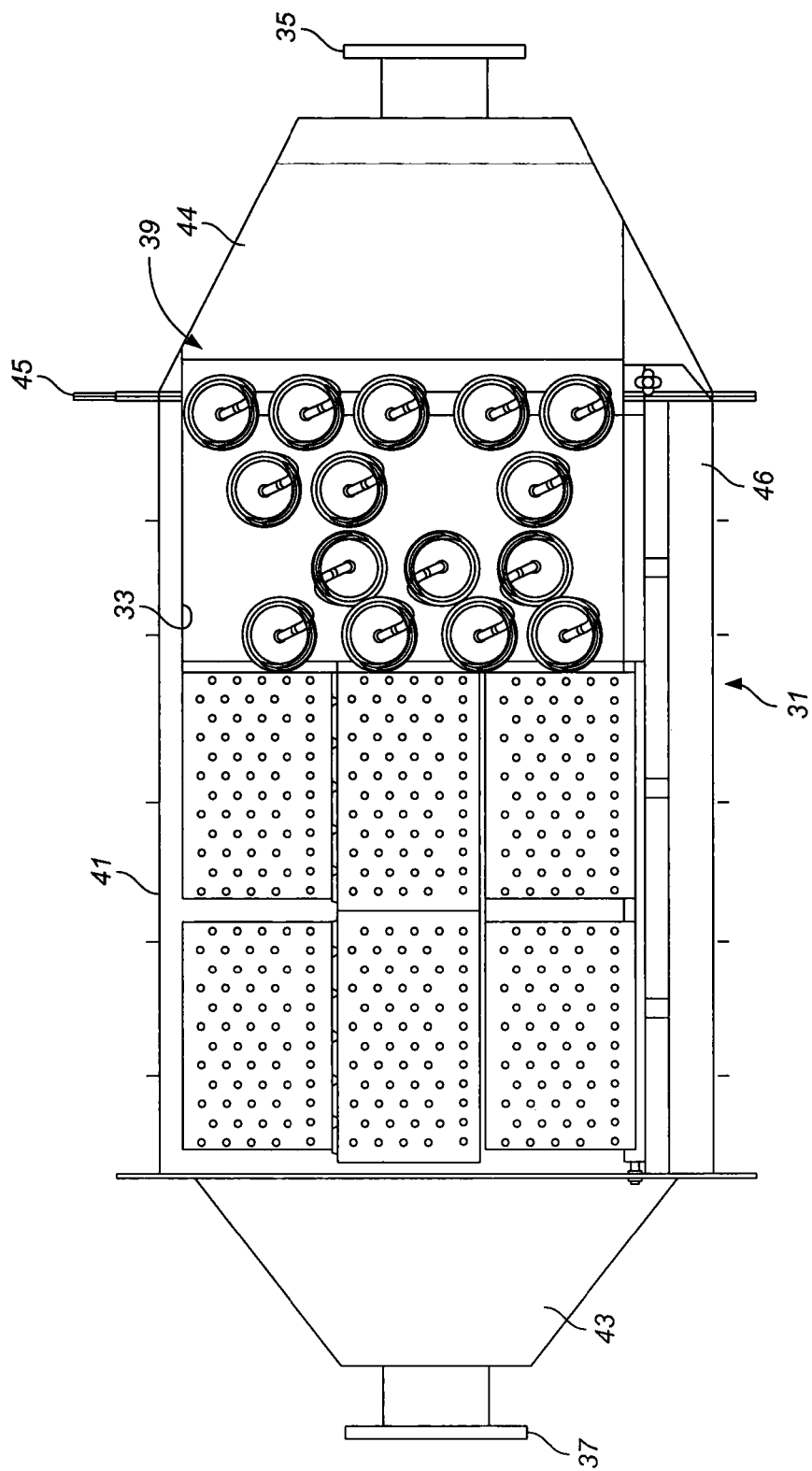

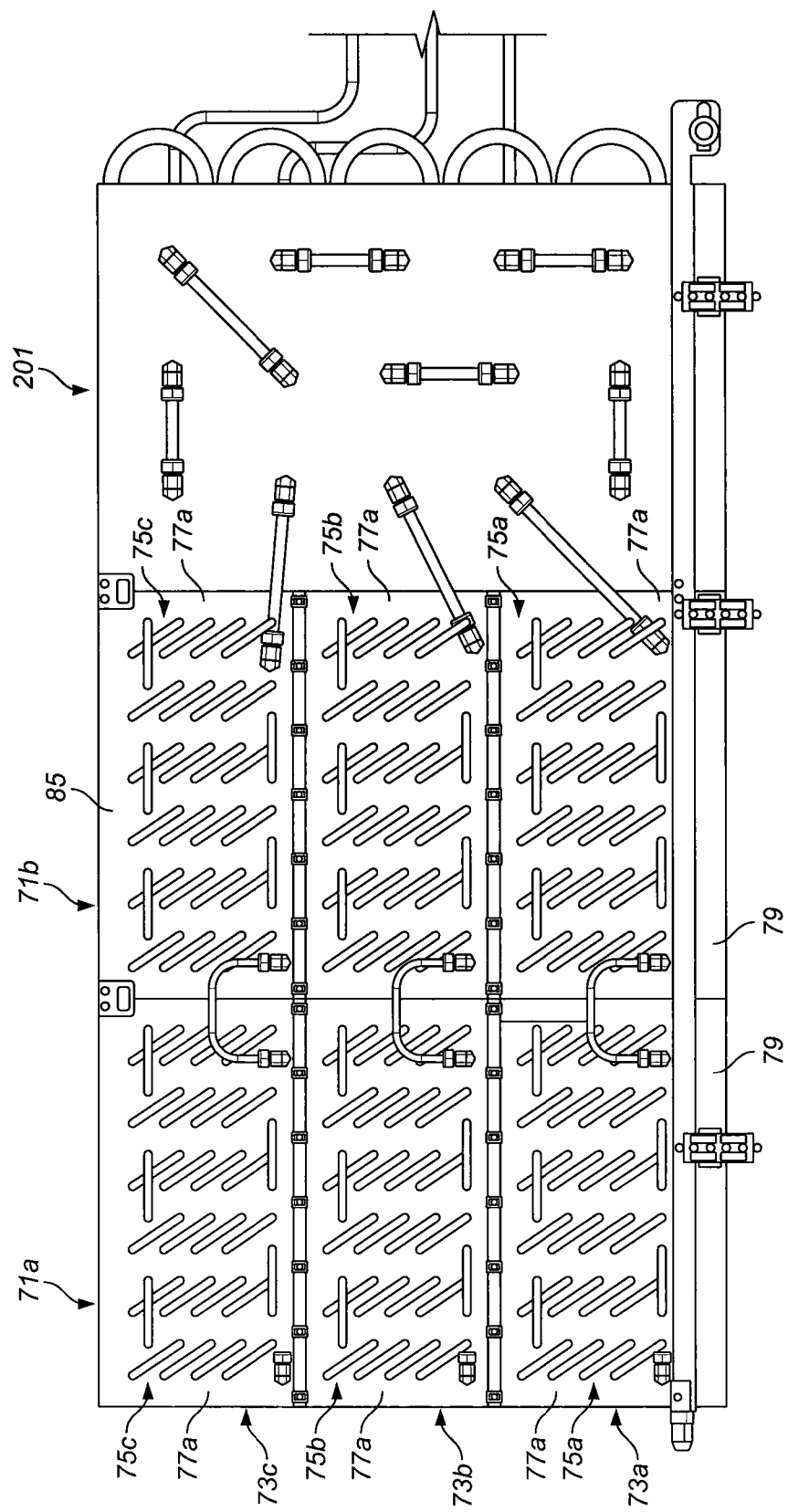

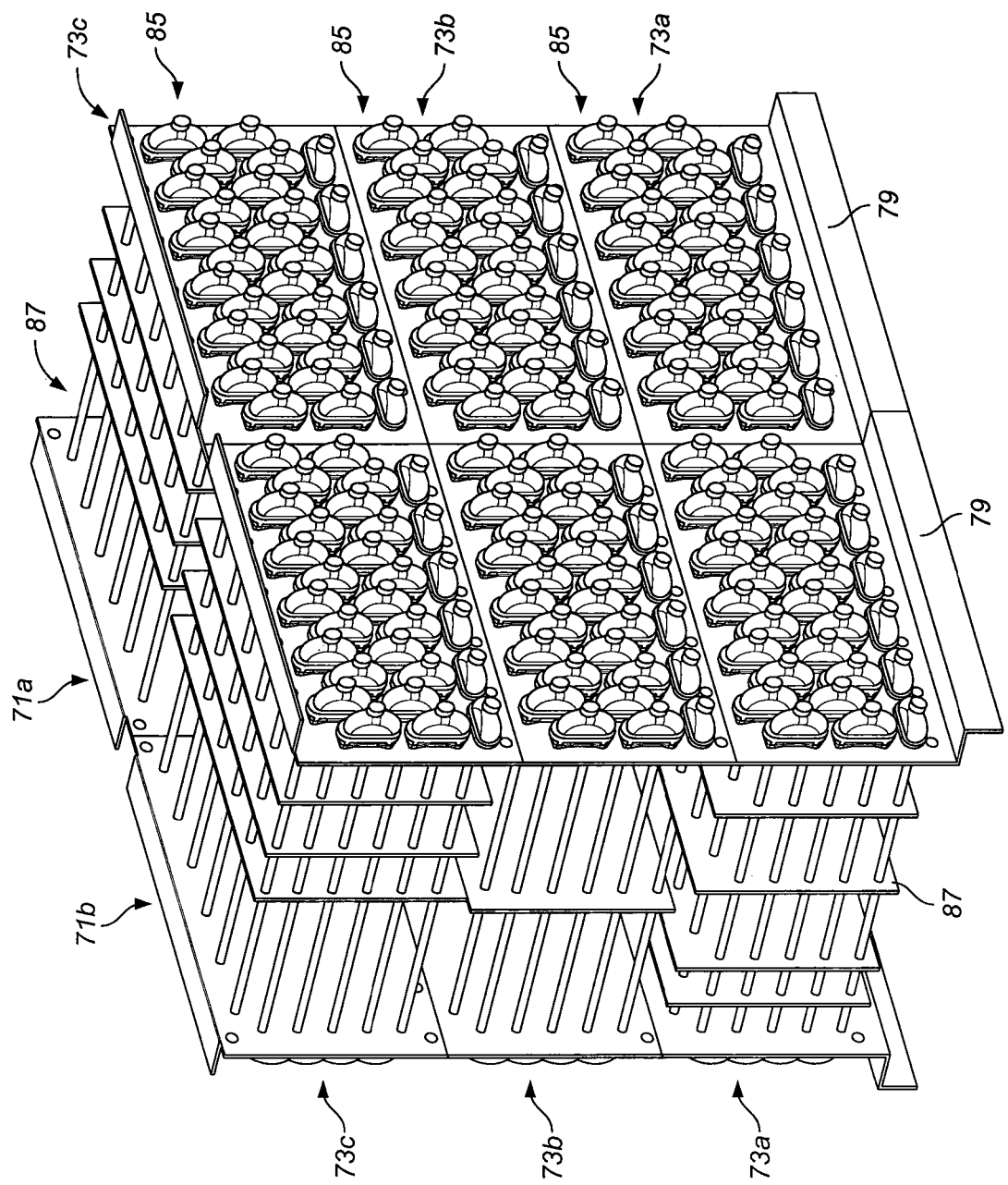

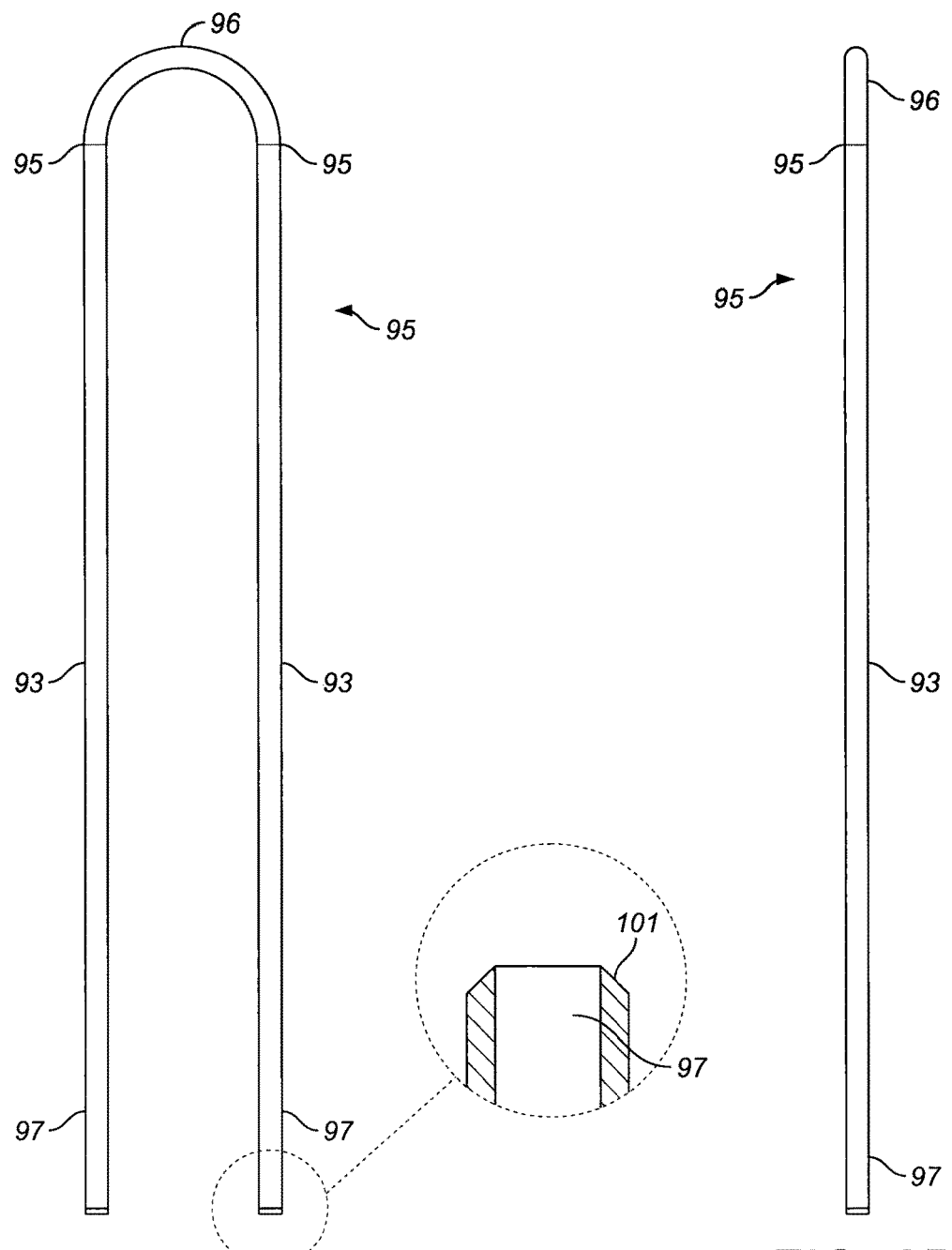
FIG. 8A
FIG. 8B
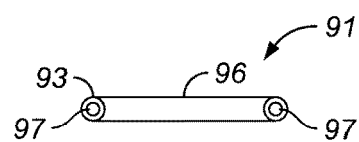
FIG. 8C

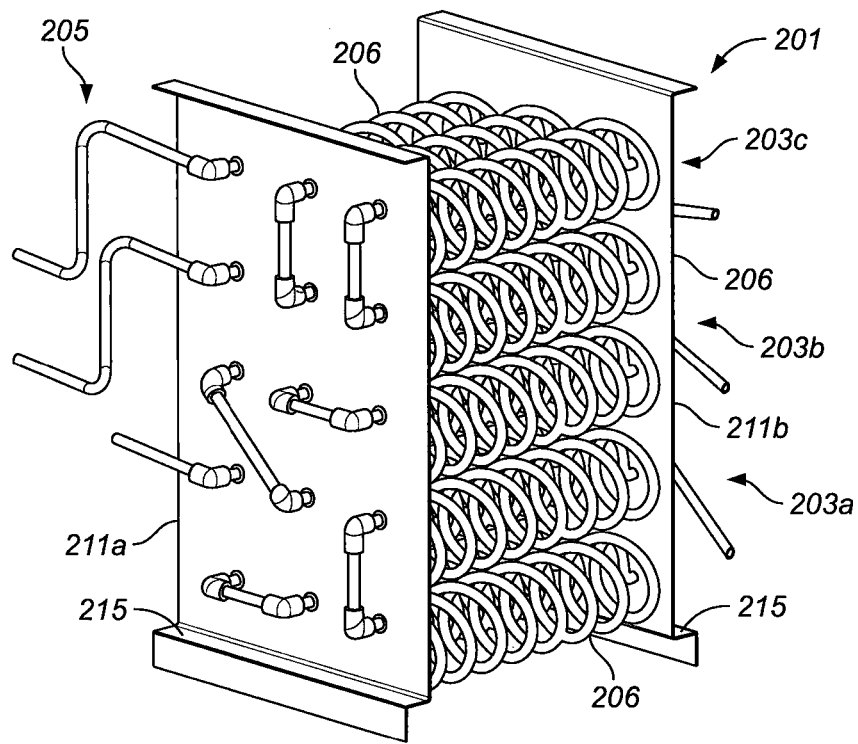
FIG. 14A
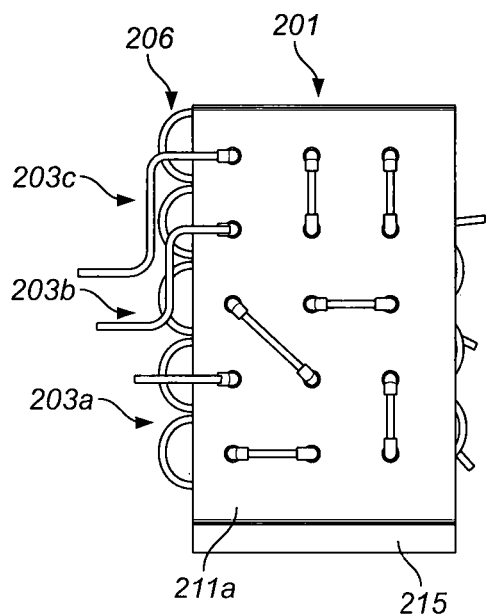 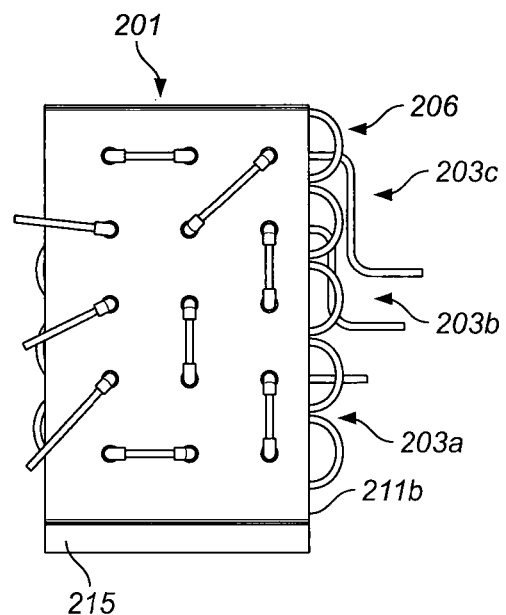
FIG. 14B  FIG. 14C

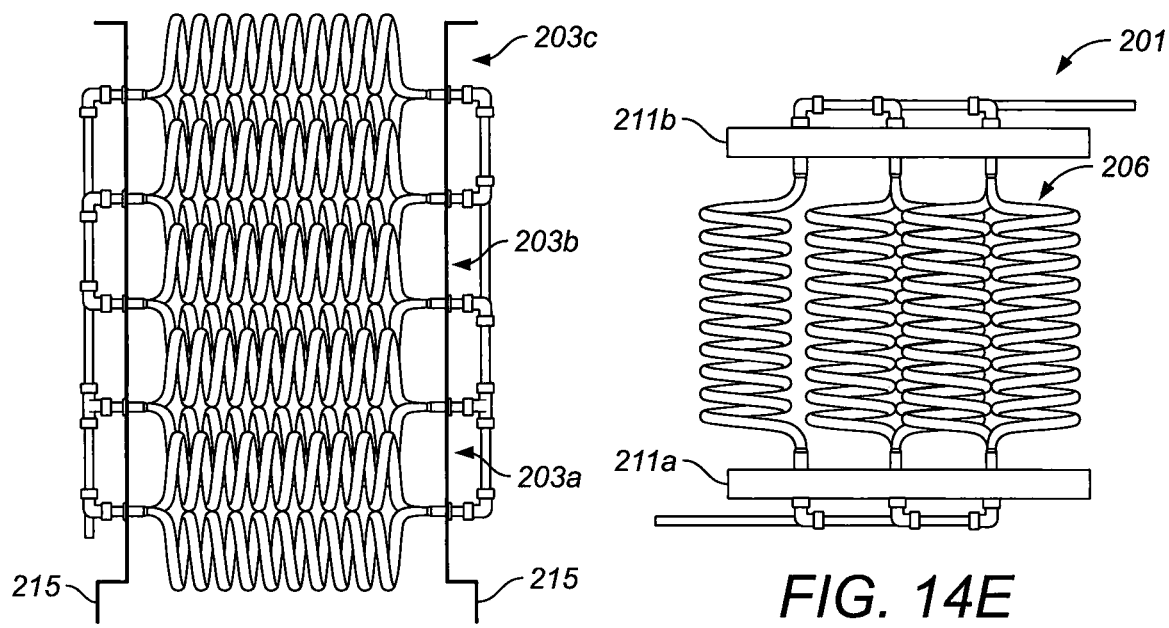
FIG. 14D
FIG. 14E
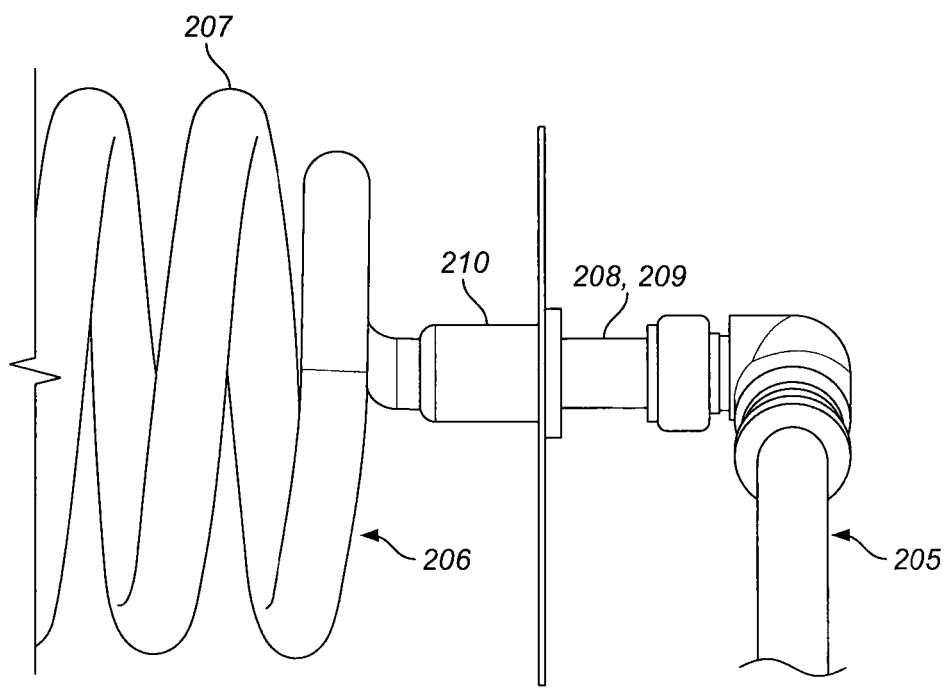
FIG. 14F

STEAM GENERATION

RELATED APPLICATION DATA

This application is a continuation of International Patent Application No. PCT/GB2013/000040 filed Jan. 31, 2013, which claims priority to International Patent Application No. PCT/GB2013/000039 filed Jan. 31, 2013 and United Kingdom Patent Application Nos. 1201669.7, 1201670.5, 1201671.3, 1201673.9, 1201674.7 and 1201672.1 all of which were filed on Jan. 31, 2012, which are all hereby incorporated herein by reference in their entirety.

The present invention relates to a steam generator which generates superheated fluid from a stream of heated gas, and a power generation system which incorporates such a steam generator to generate power, typically electricity using an electrical generator.

The present invention has particular application to any kind of burner, such as a biomass burner, or any kind of combustion engine, such as a landfill anaerobic digestion gas engine, a methane burning engine, a diesel engine, a marine engine and coal gas engine.

Figure 1B:
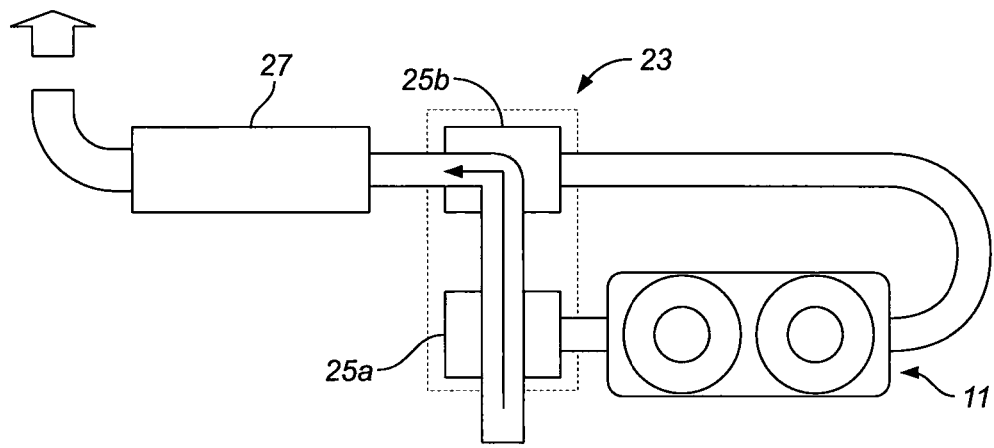
Figure 1C:
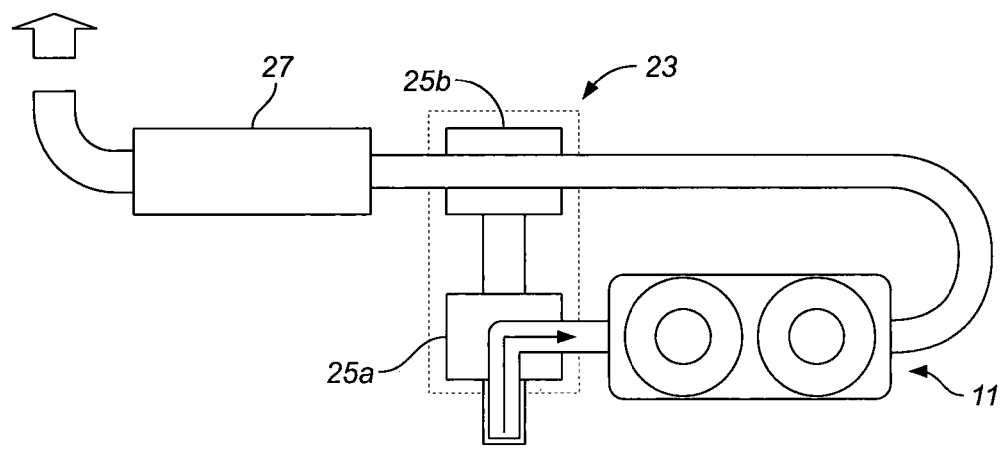
Figure 2:
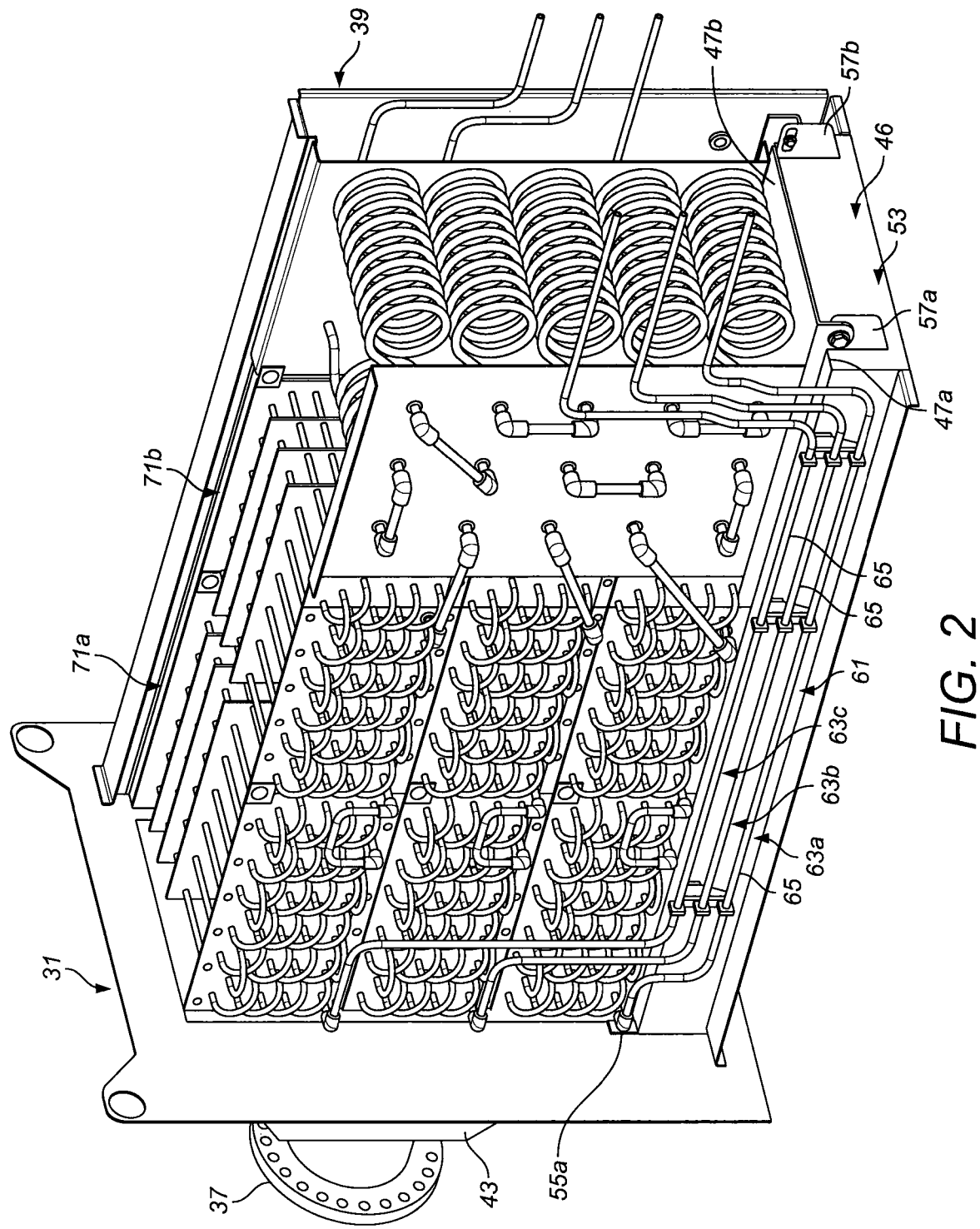
Figure 3:
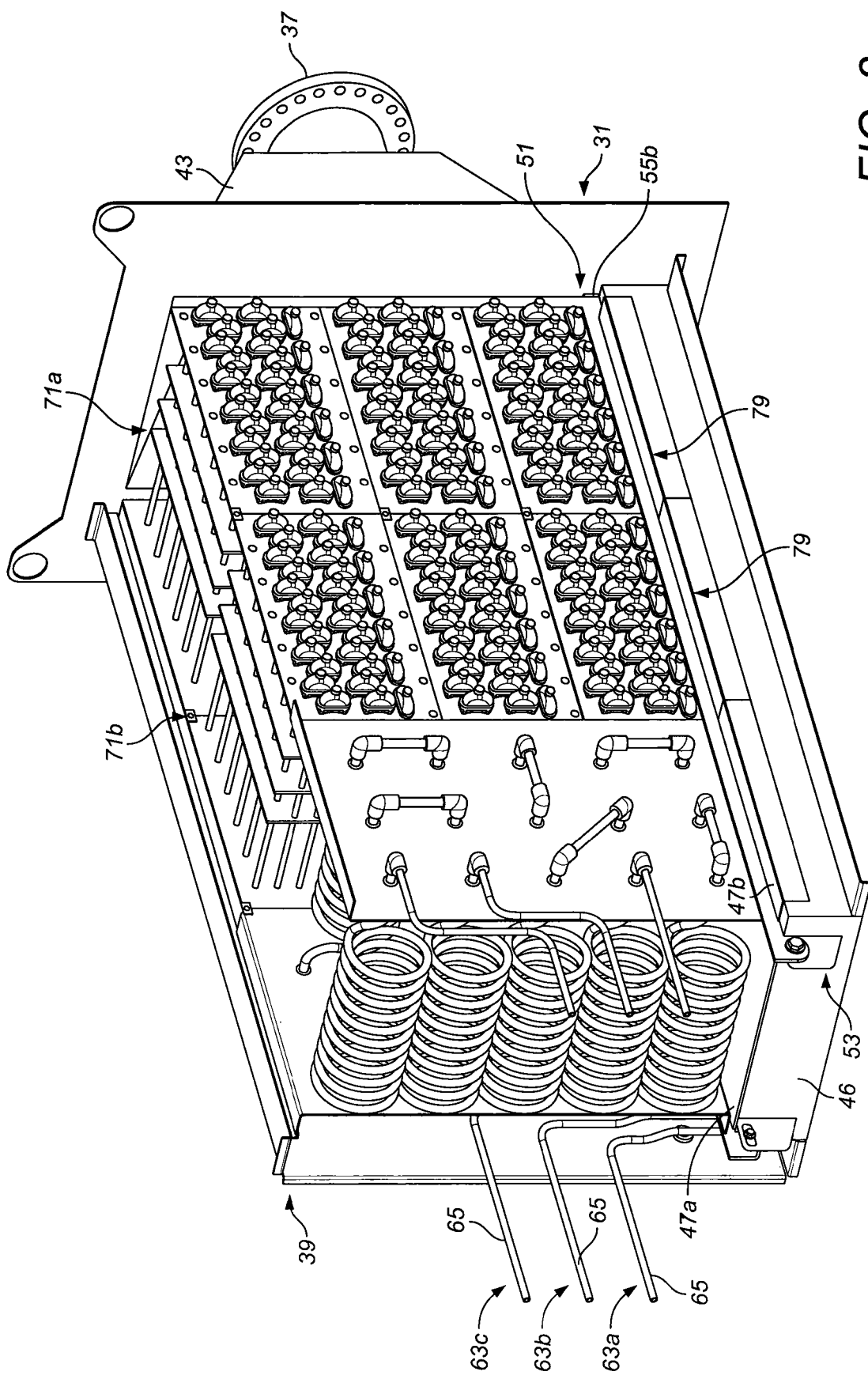
Figure 4A:
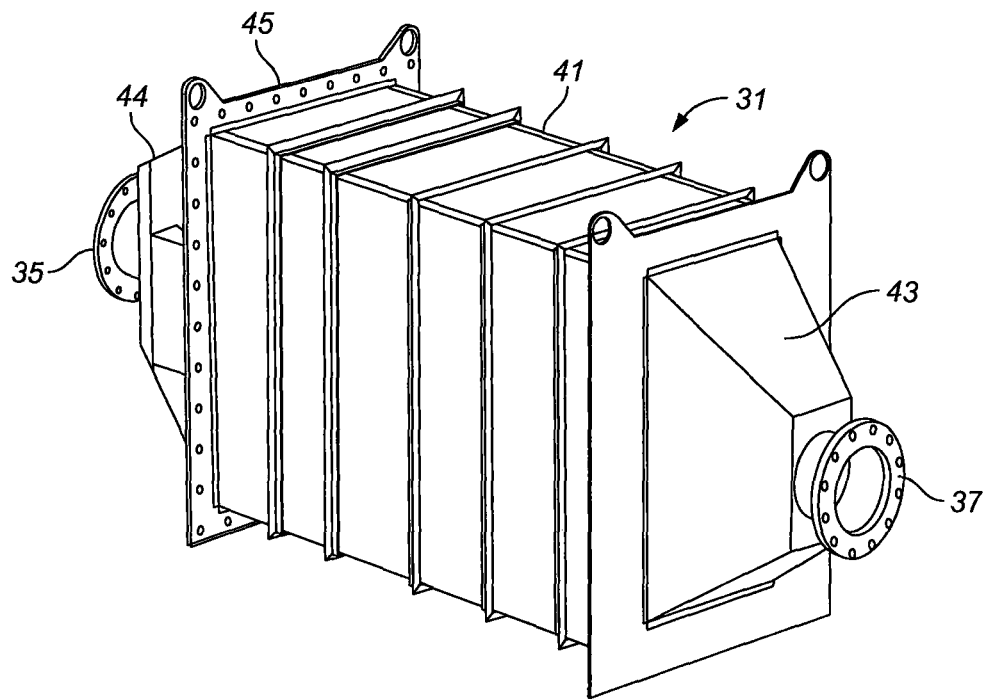
Figure 4B:
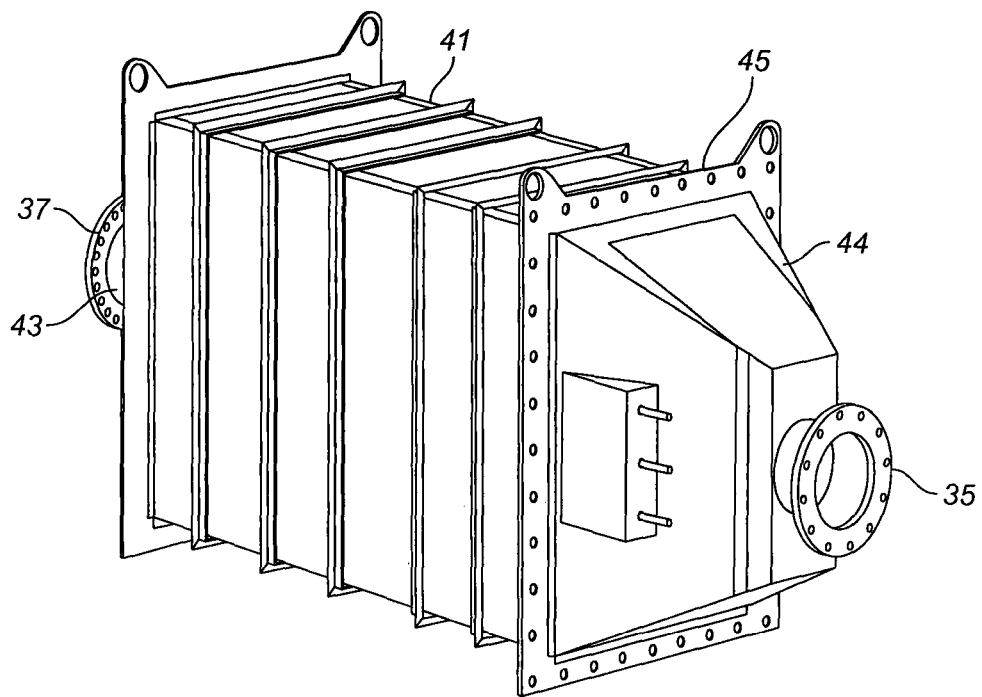
Figure 4C:
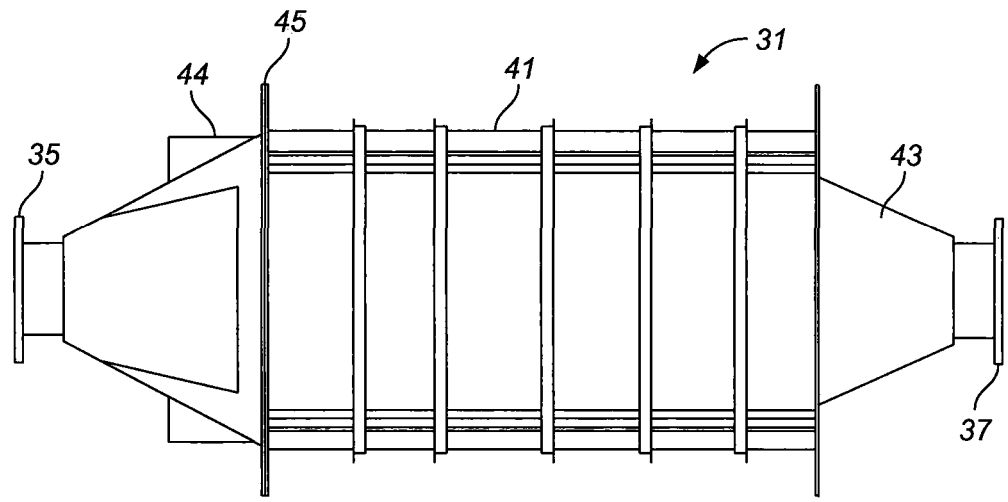
Figure 4D:
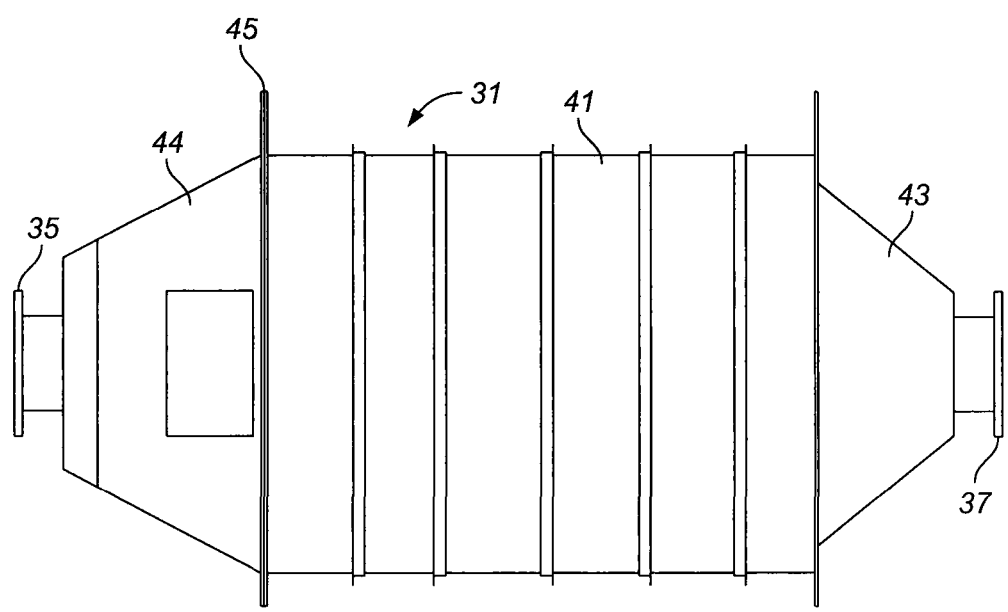
Figure 4E:
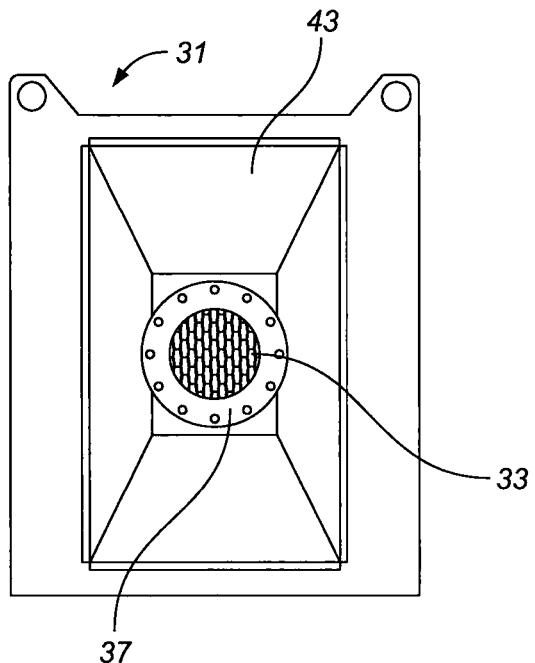
Figure 4F:
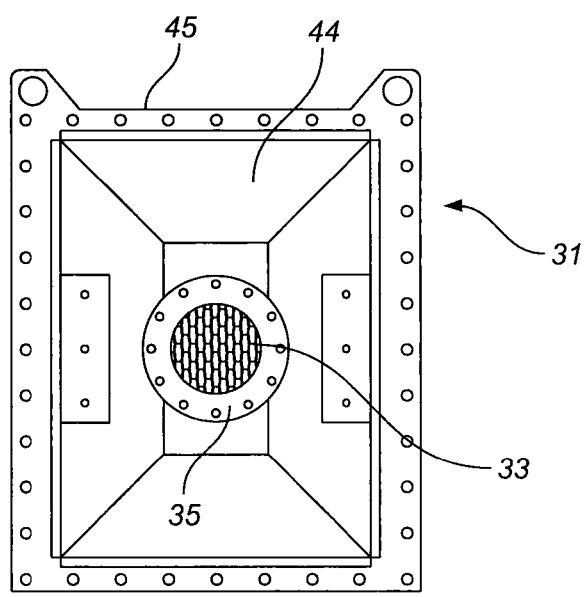
Figure 4H:
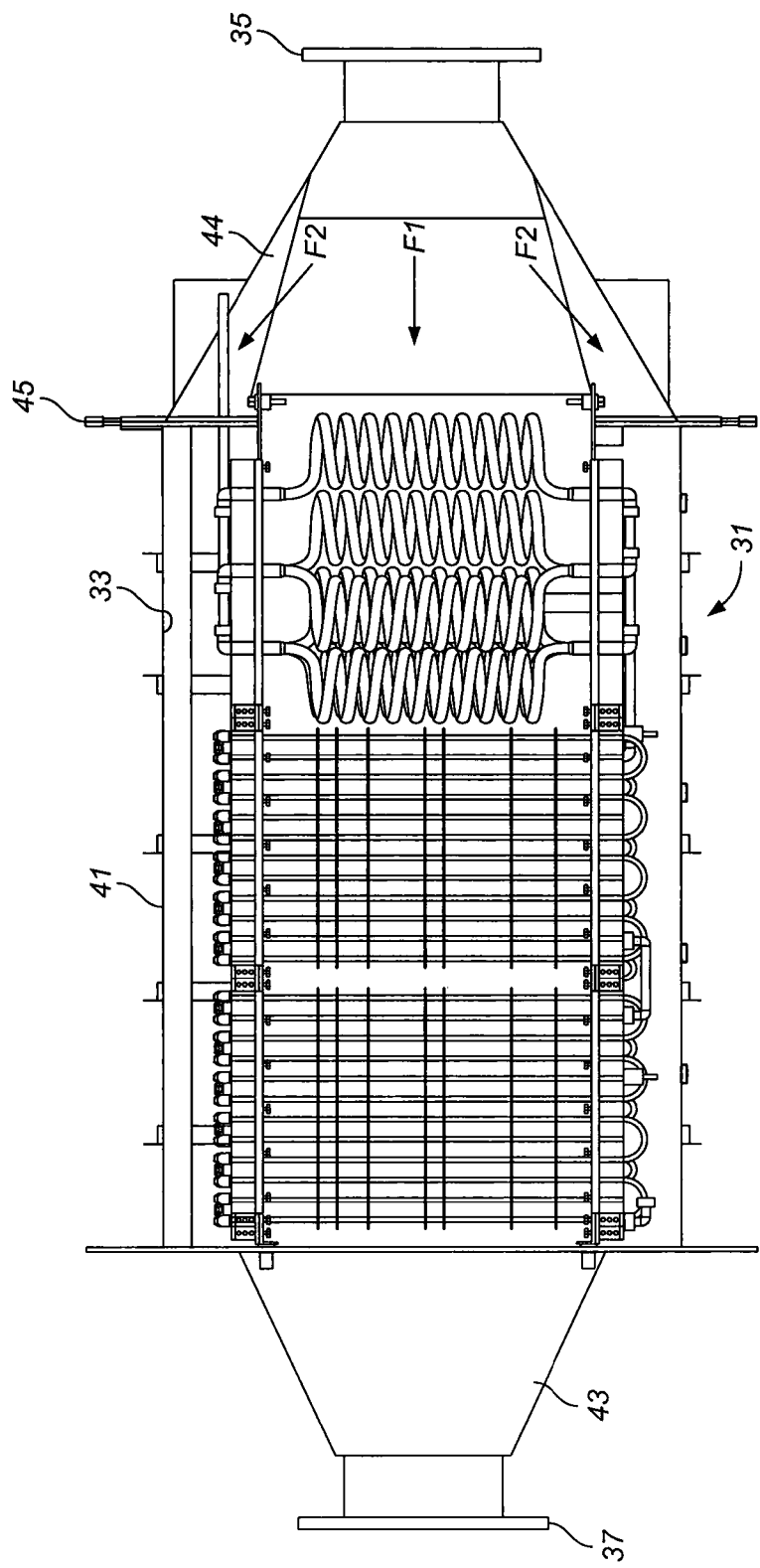
Figure 4I:
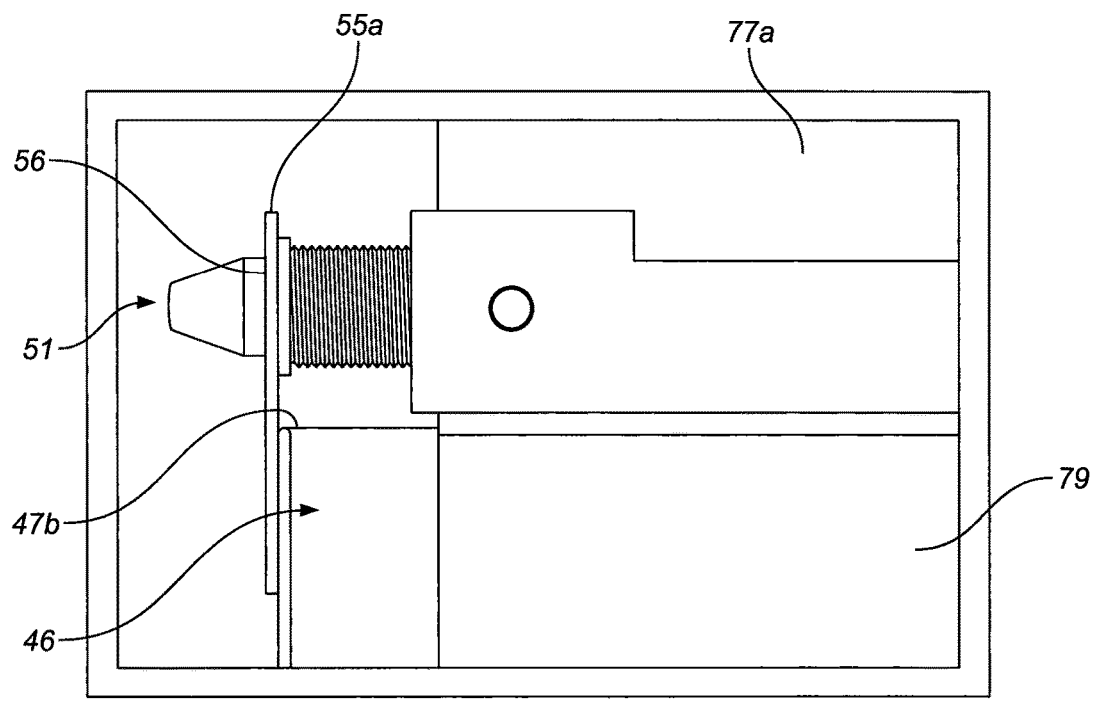
Figure 4J:
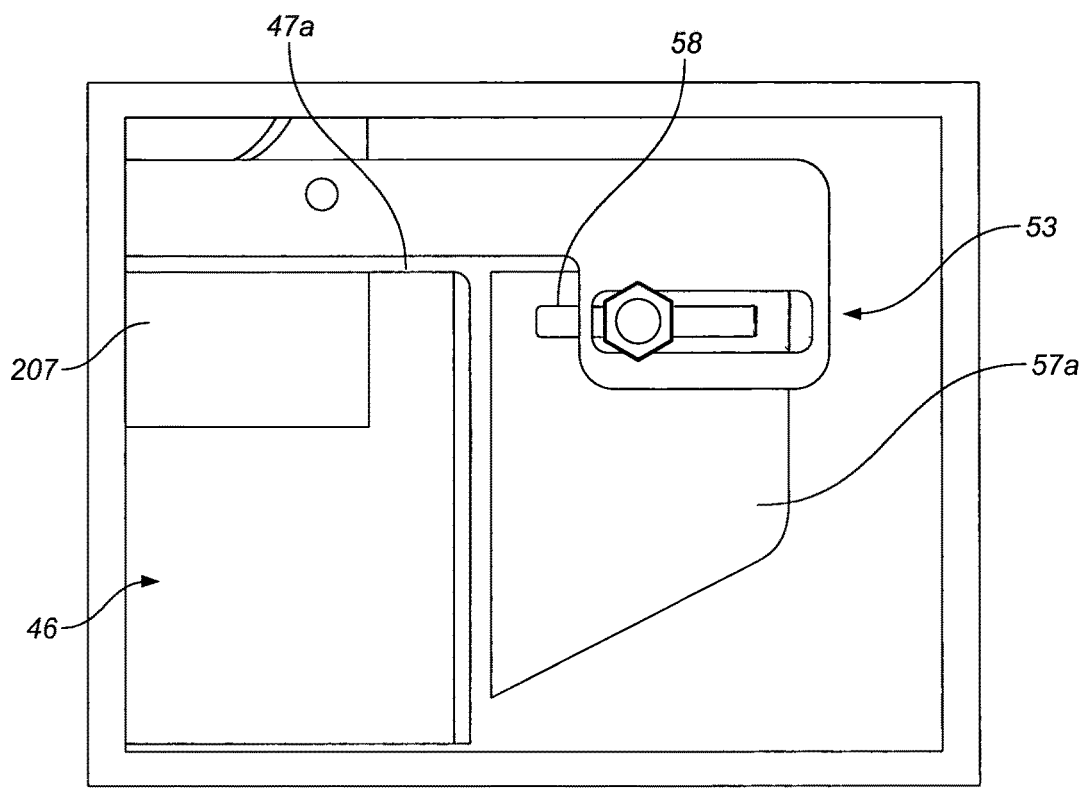
Figure 5A:
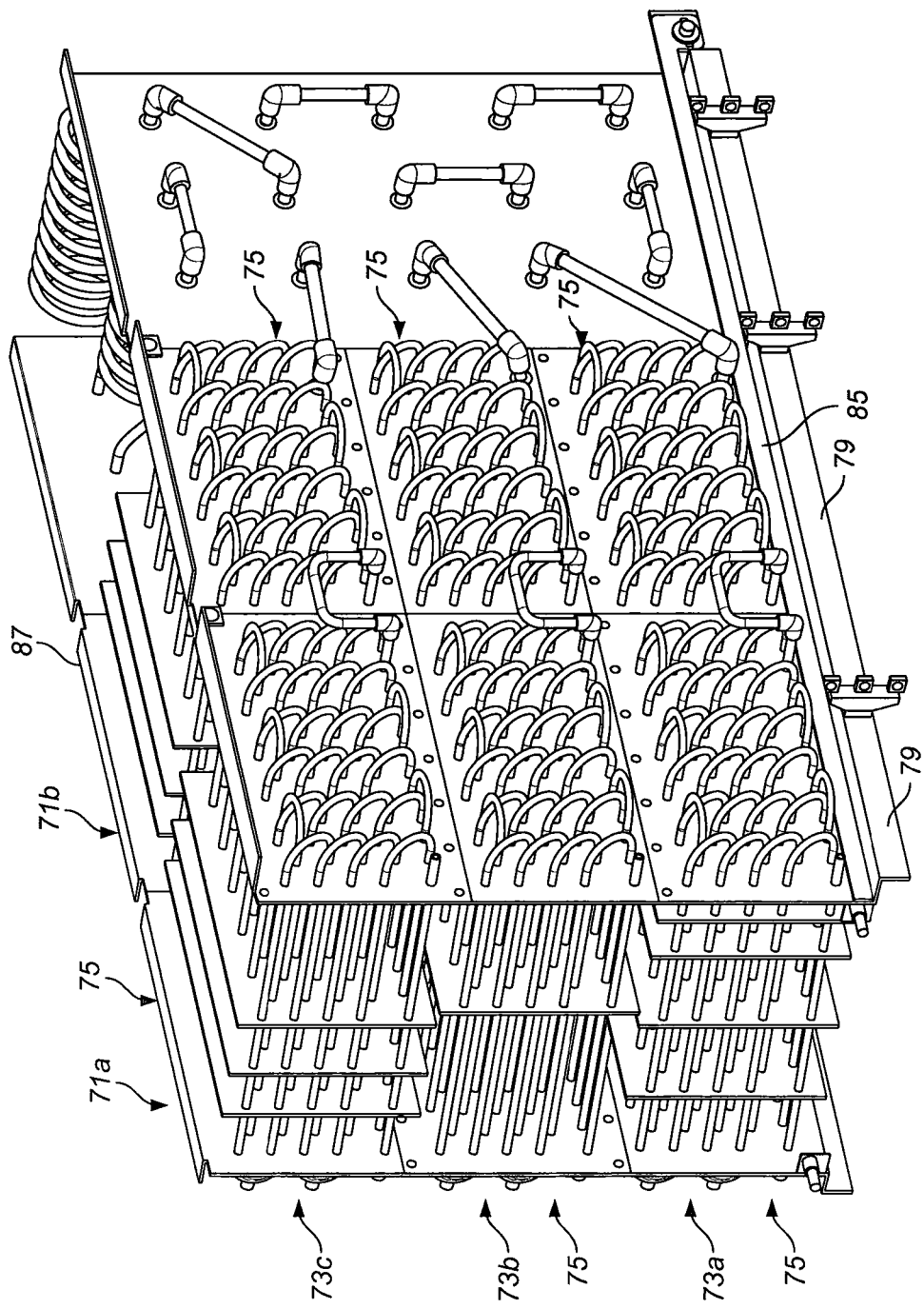
Figure 5B:
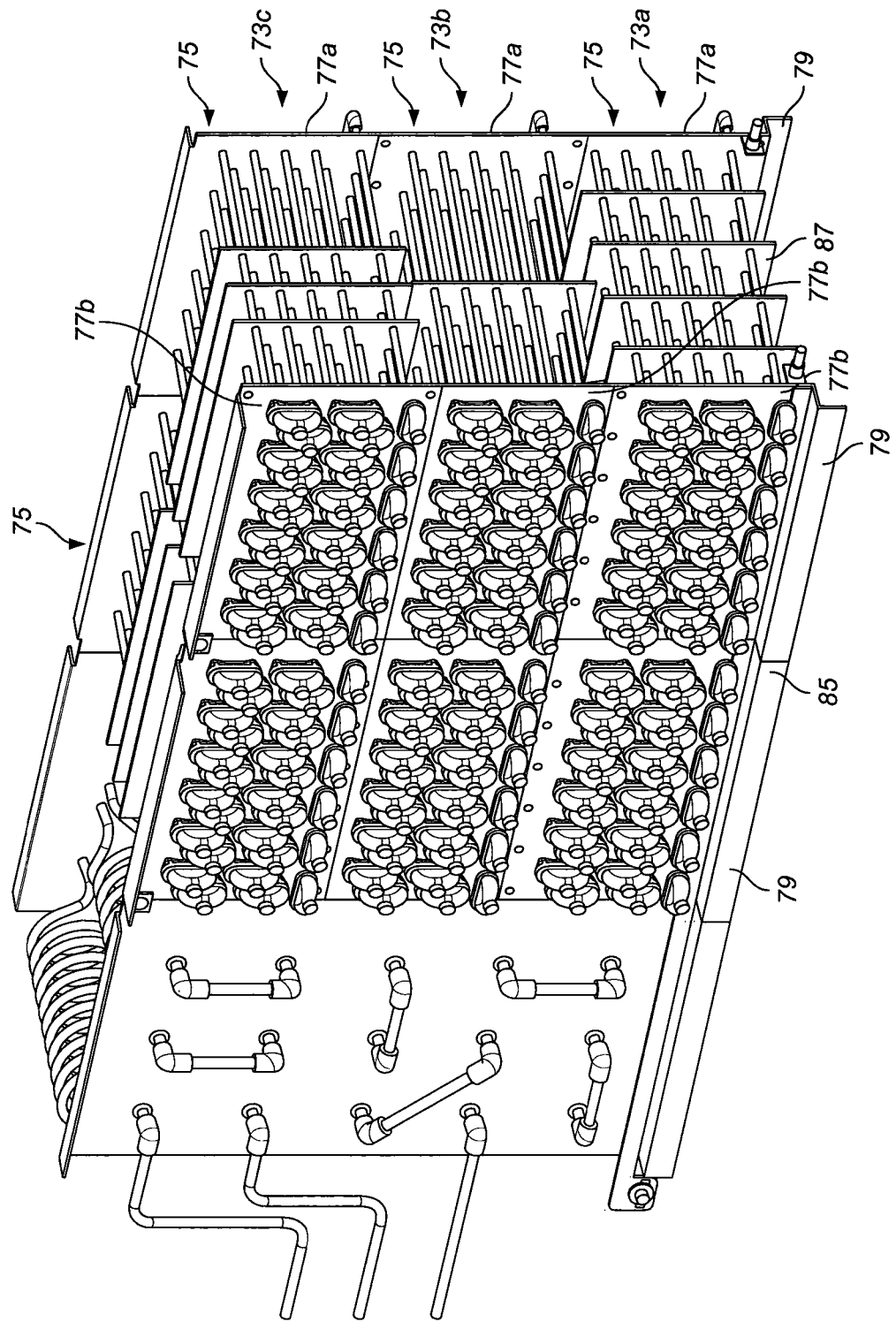
Figure 5C:
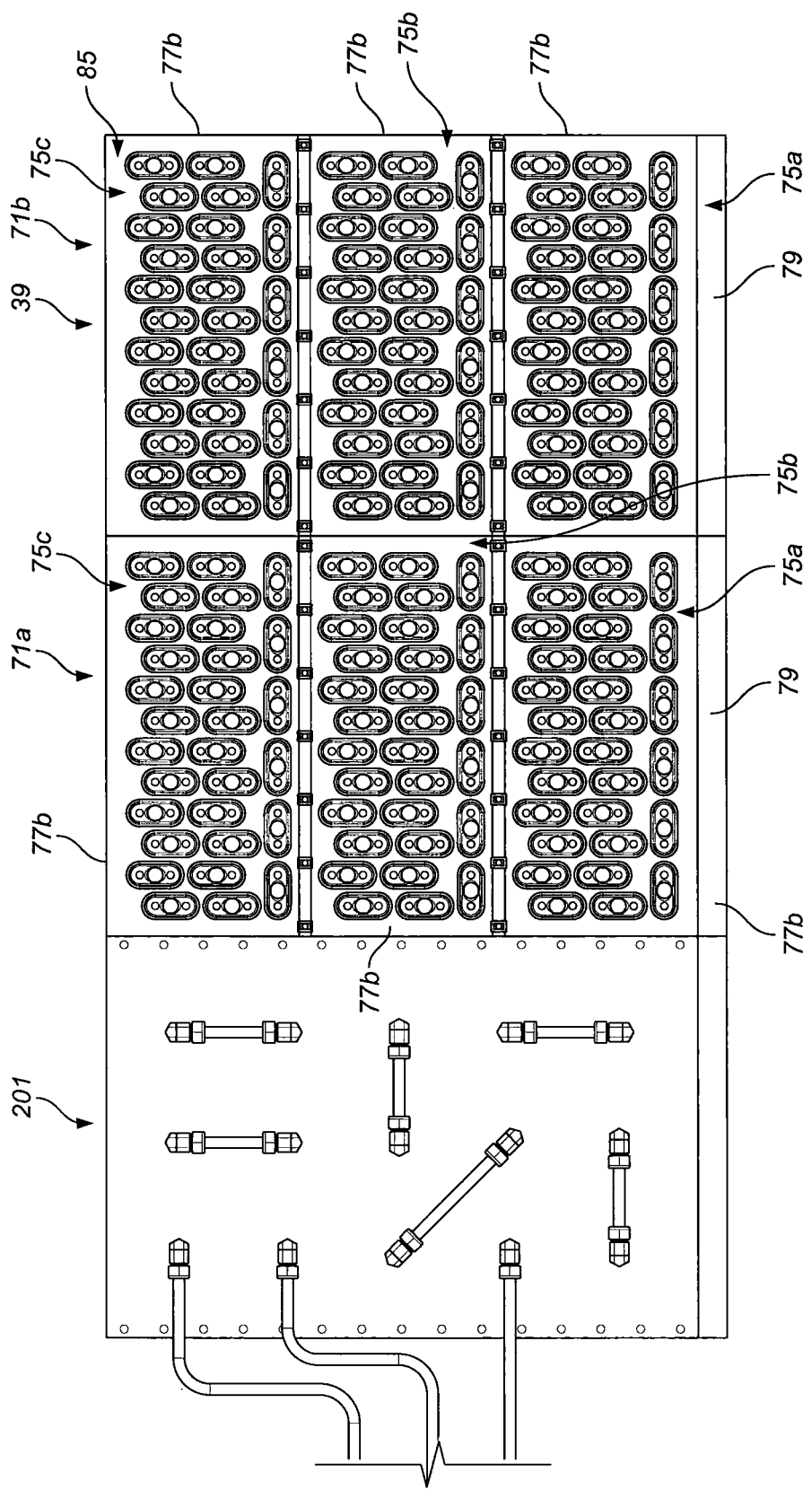
Figure 5E:
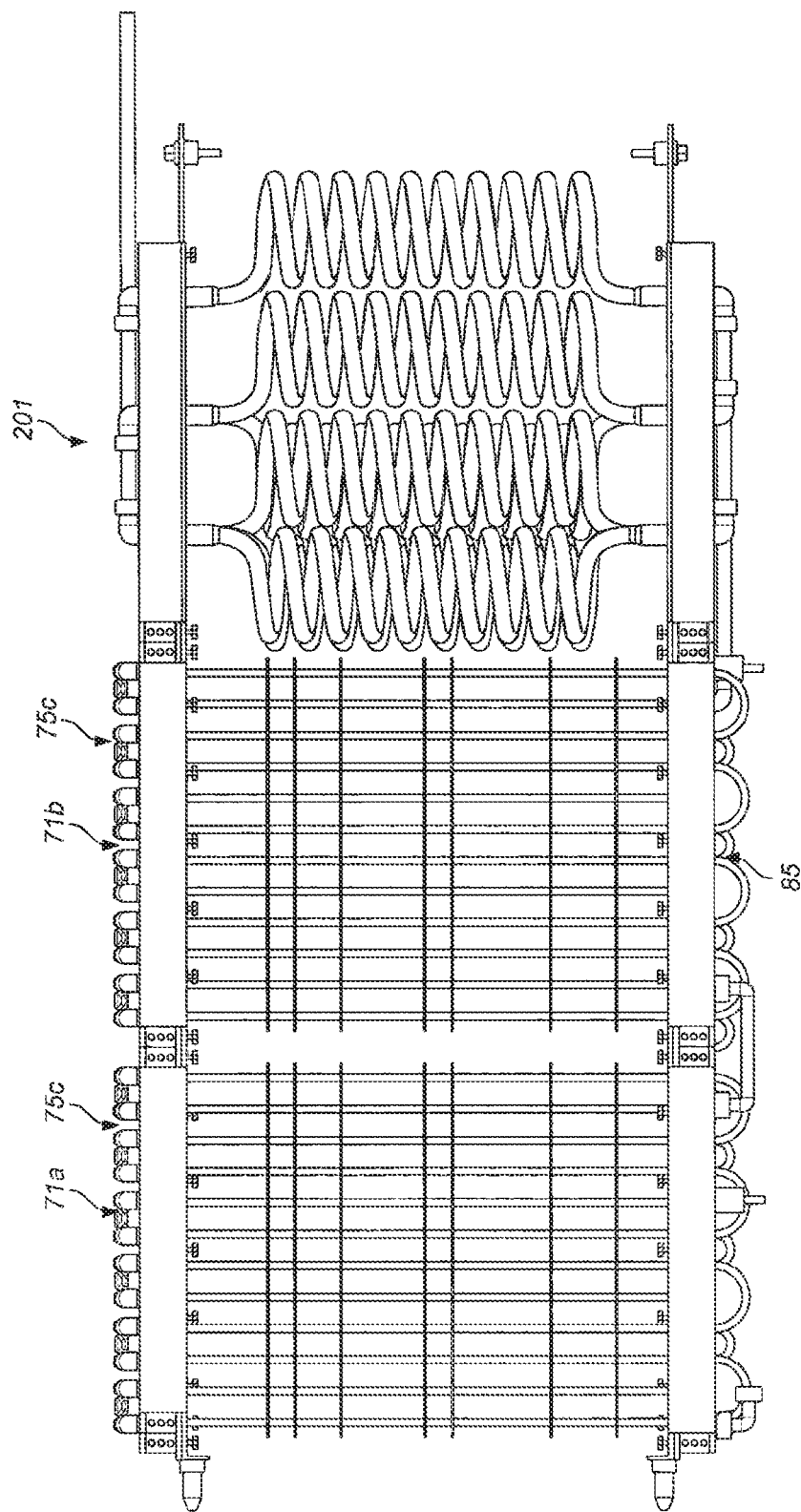
Figure 5F:
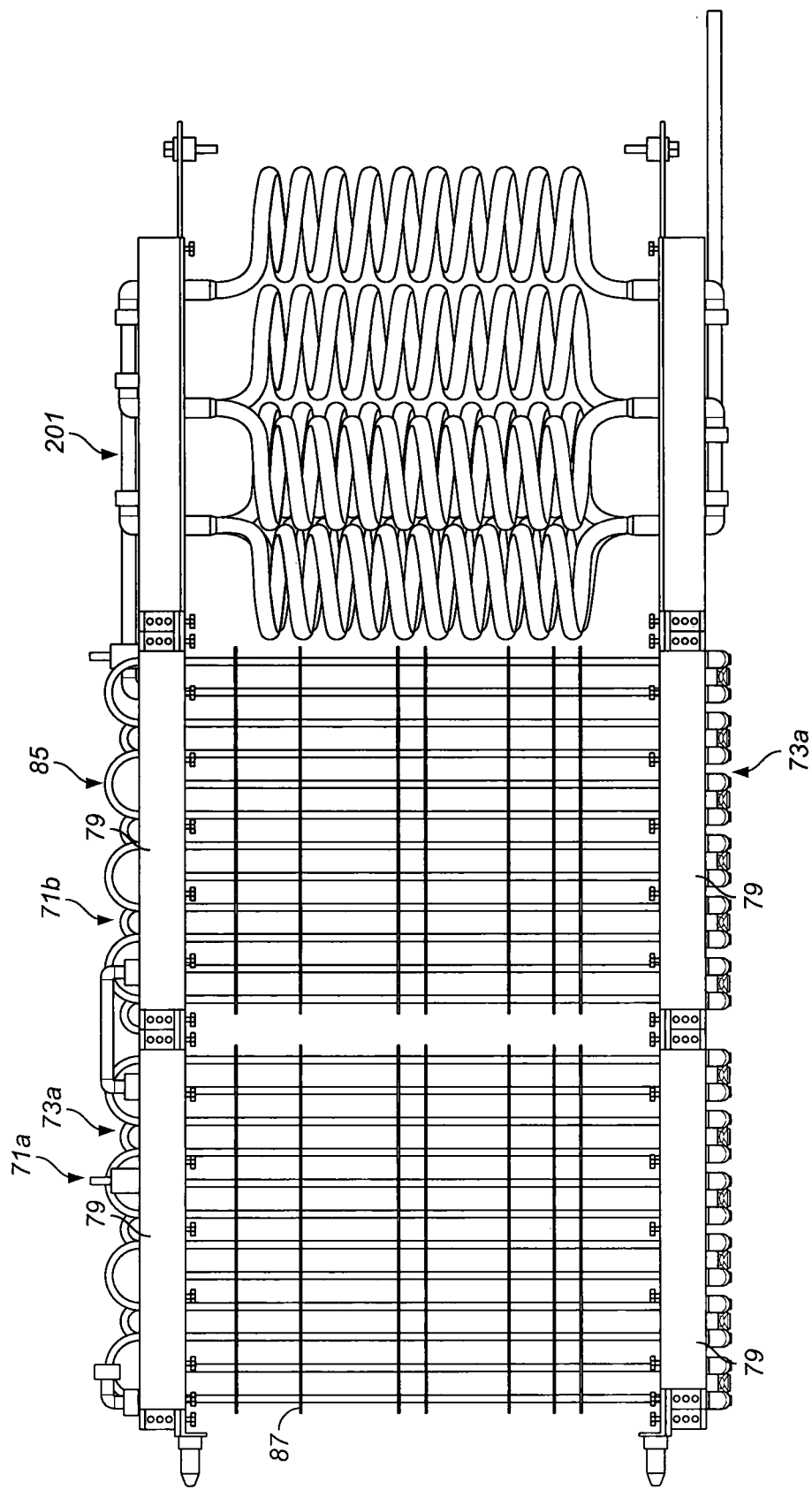
Figure 5G:
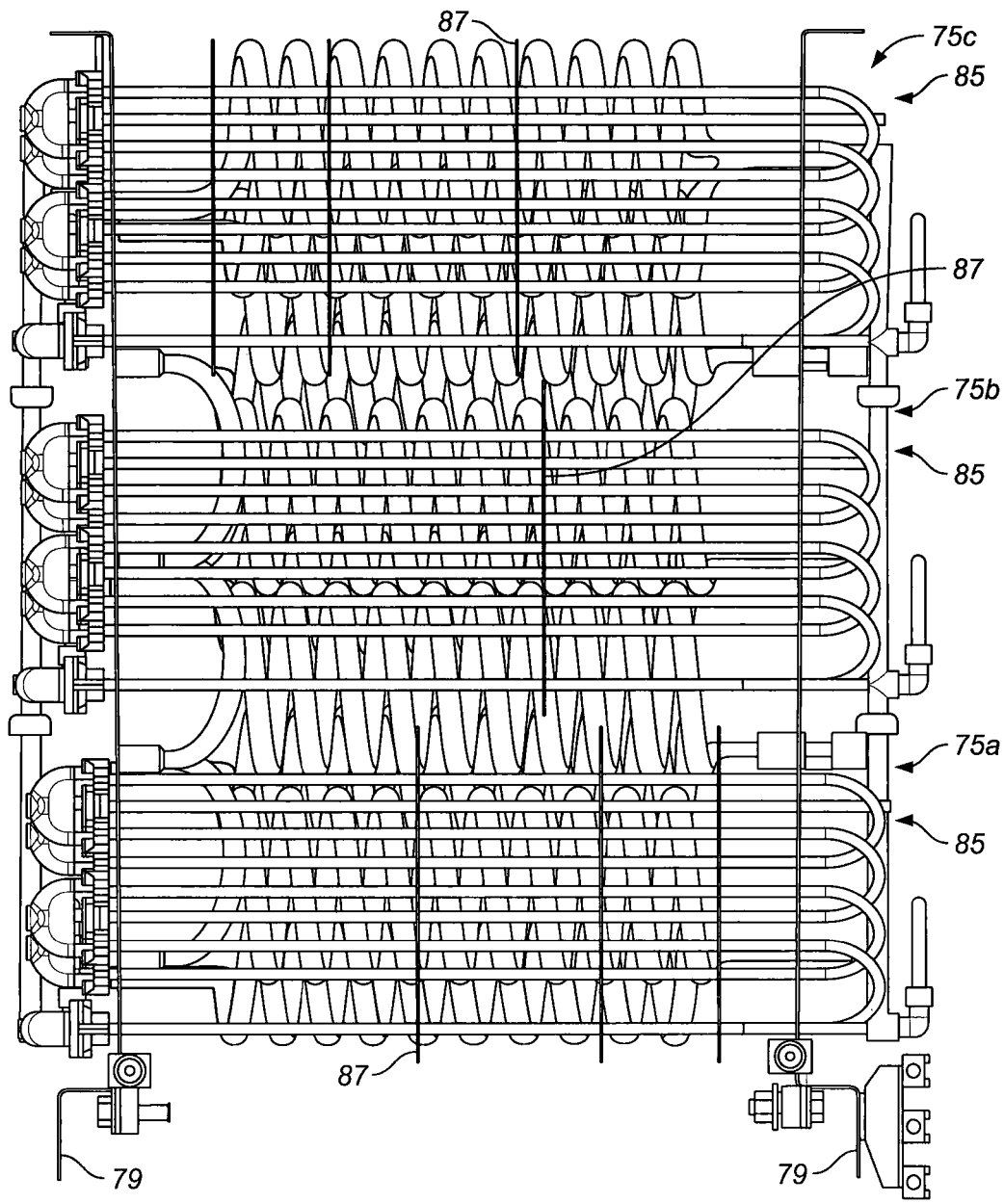
Figure 6A:
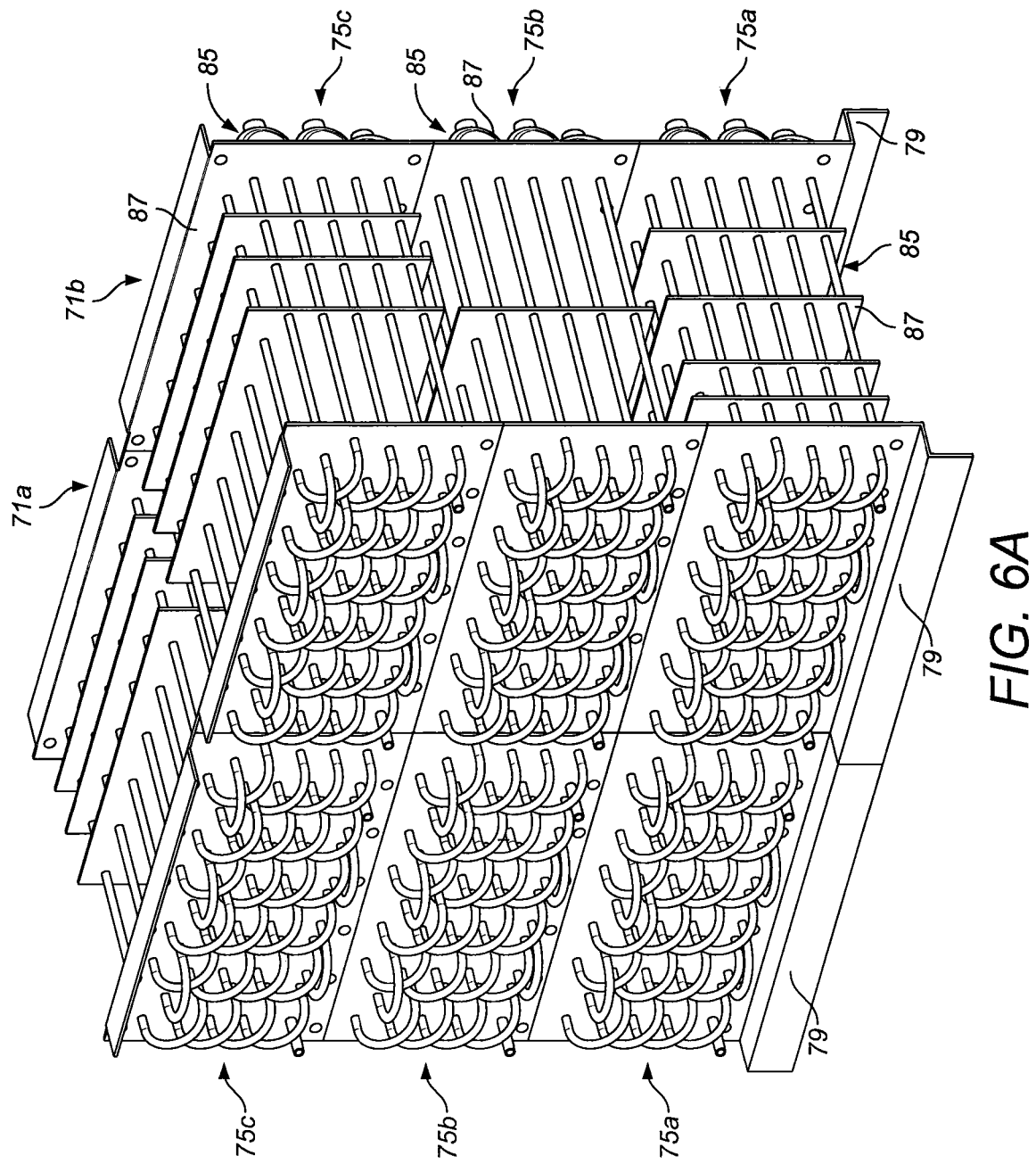
Figure 6C:
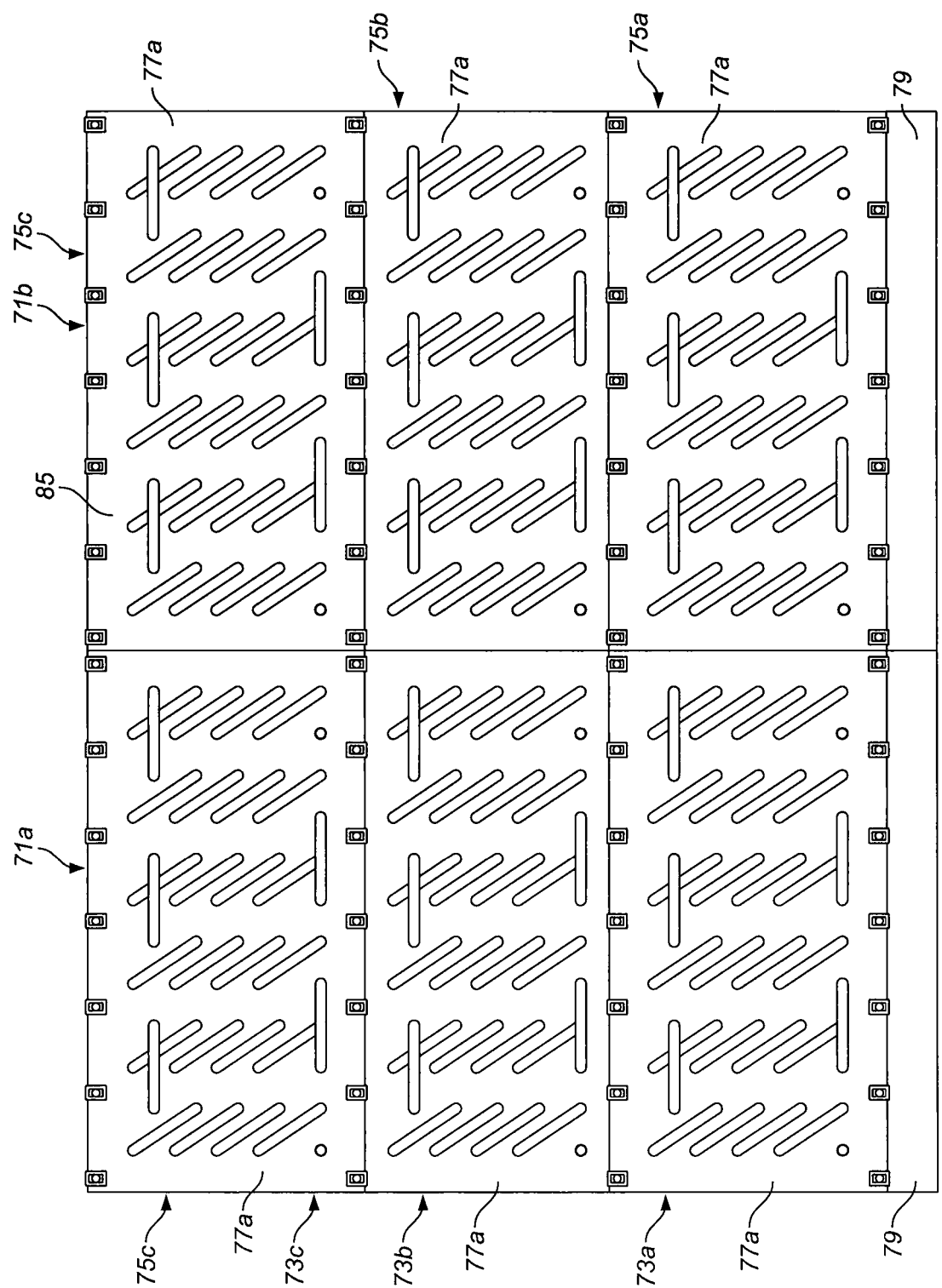
Figure 6D:
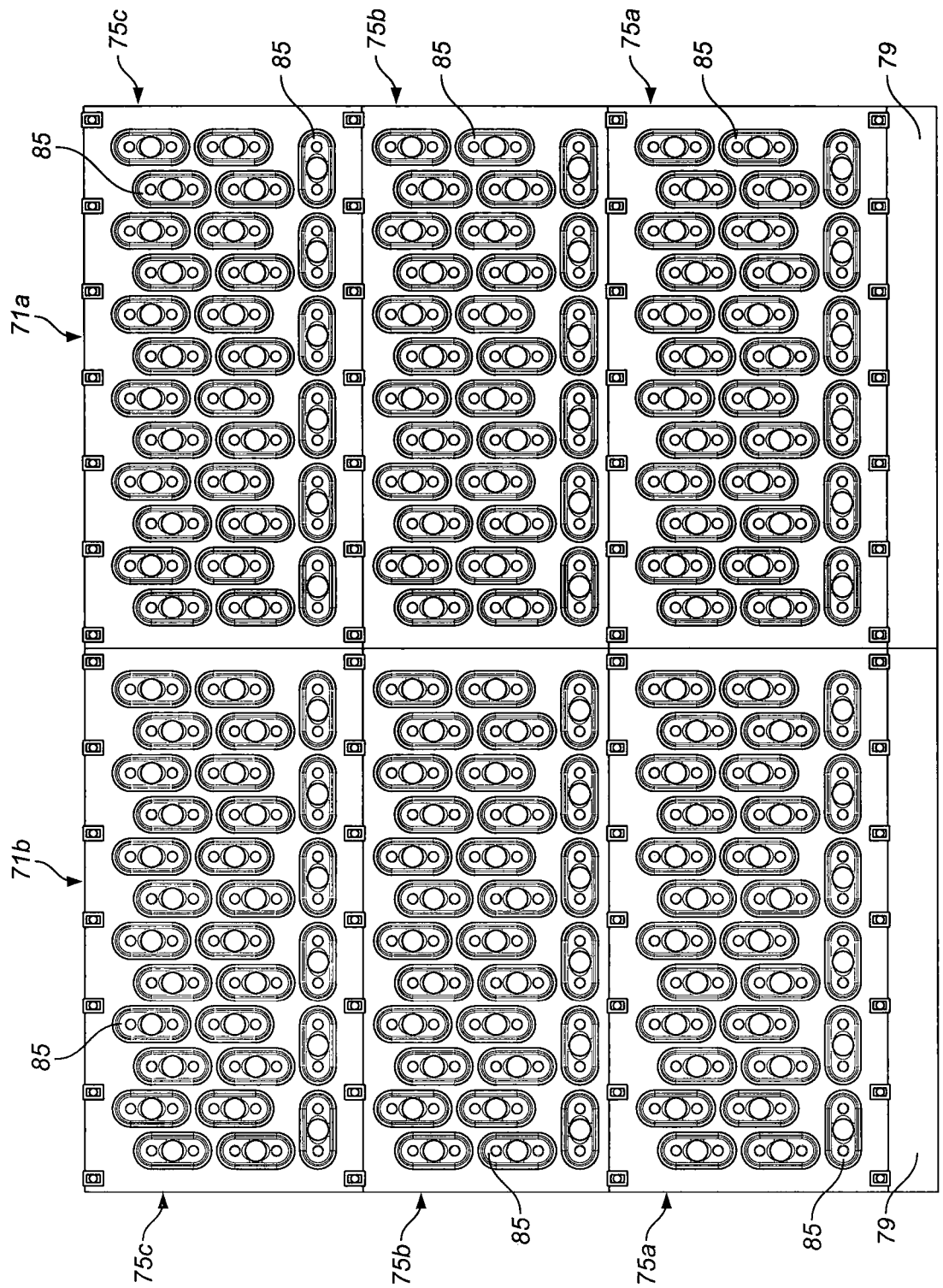
Figure 6E:
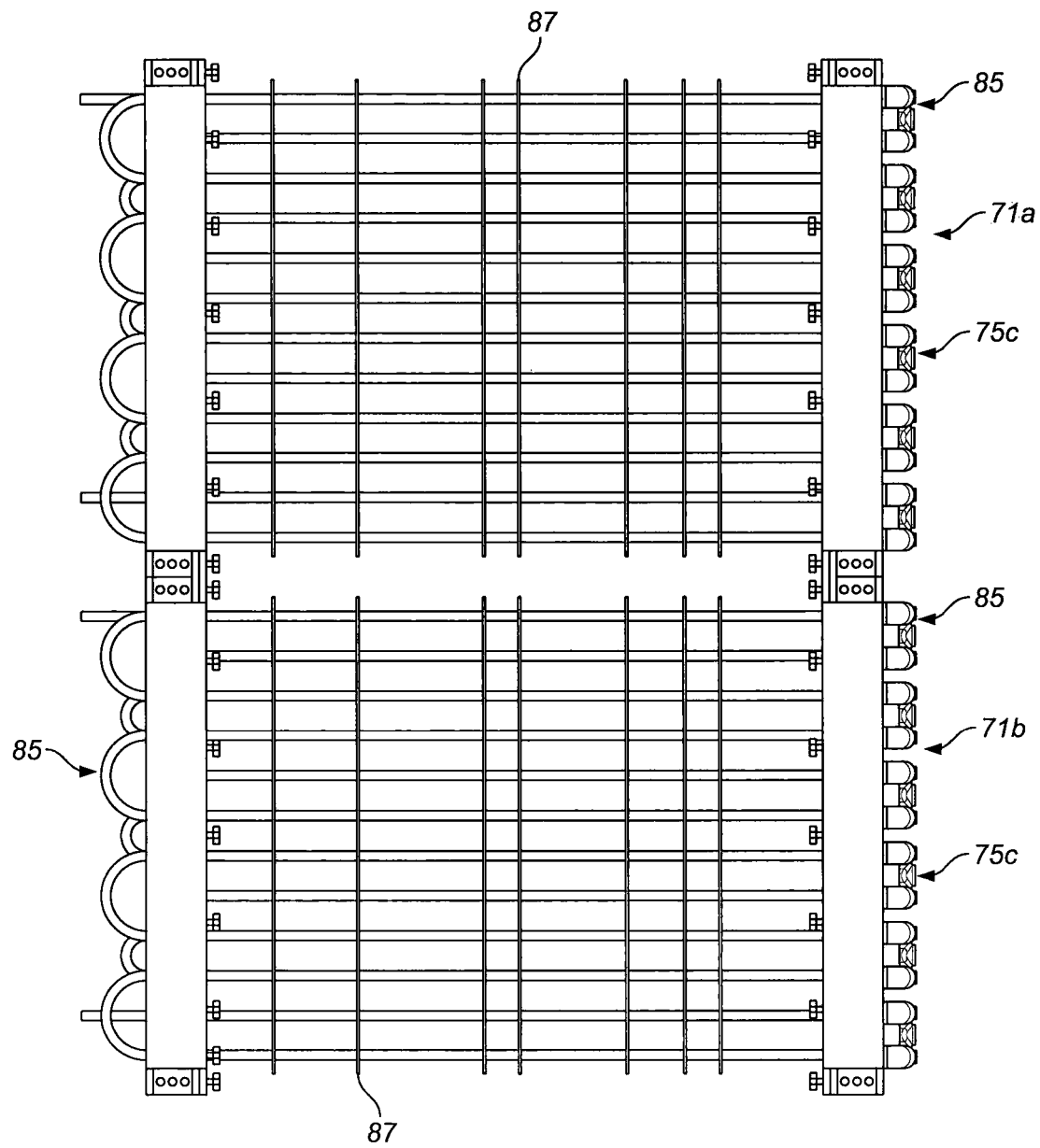
Figure 7A:
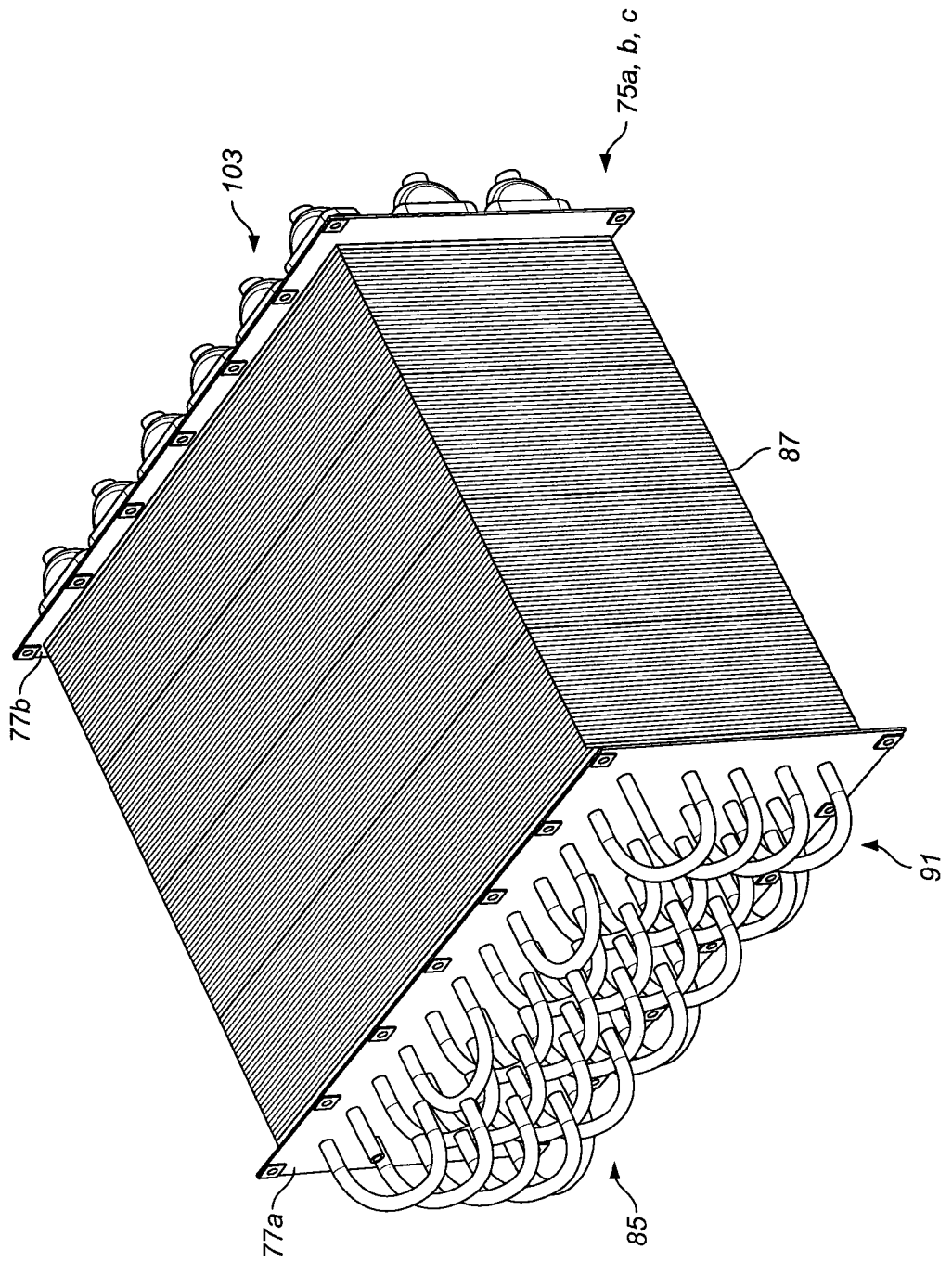
Figure 7B:
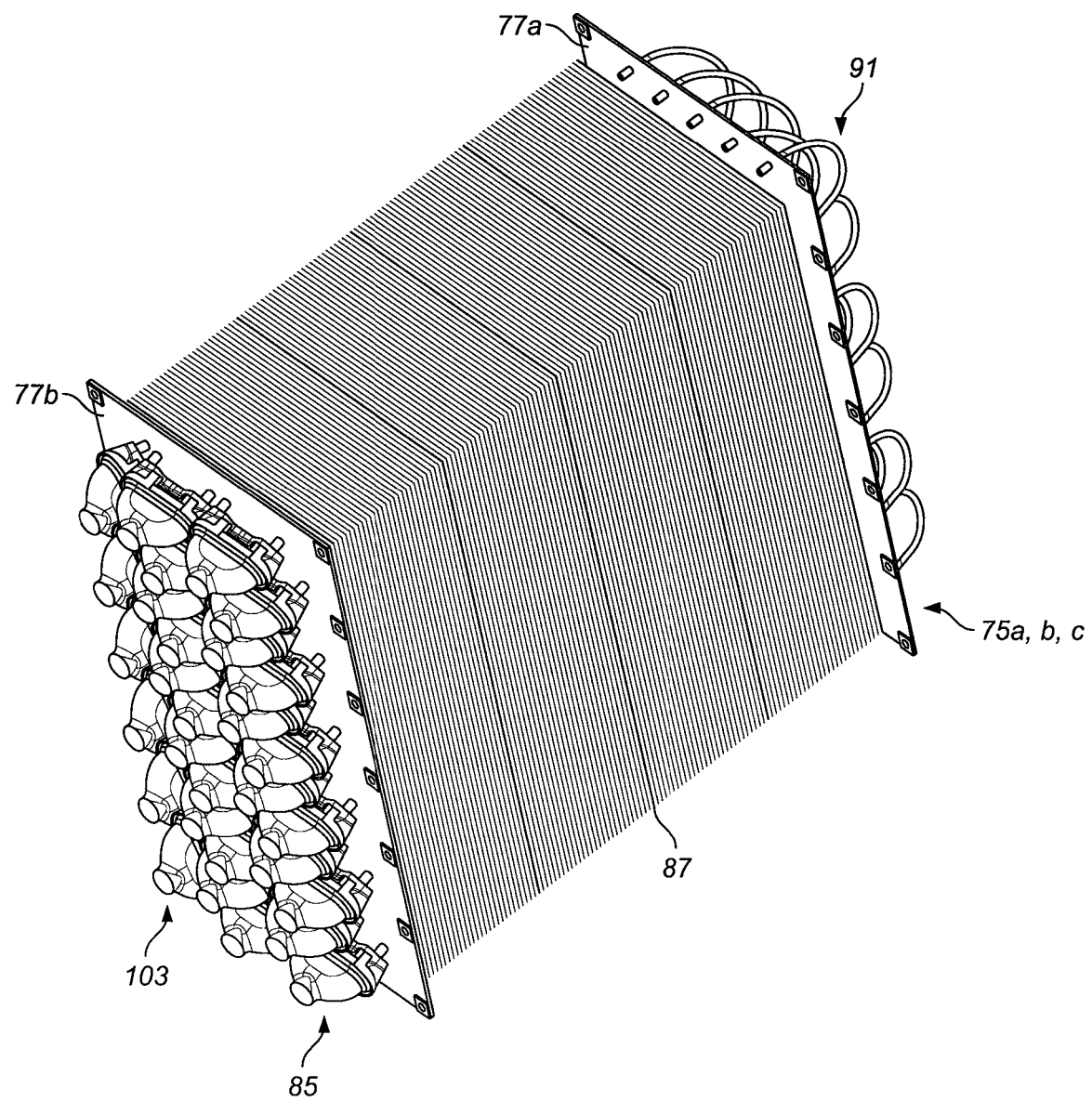
Figure 7C:
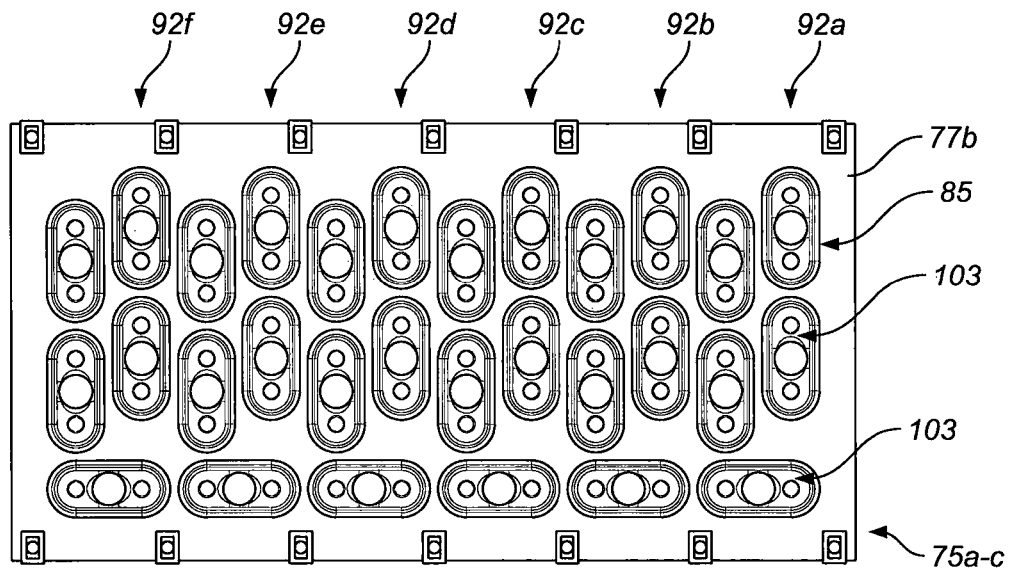
Figure 7D:
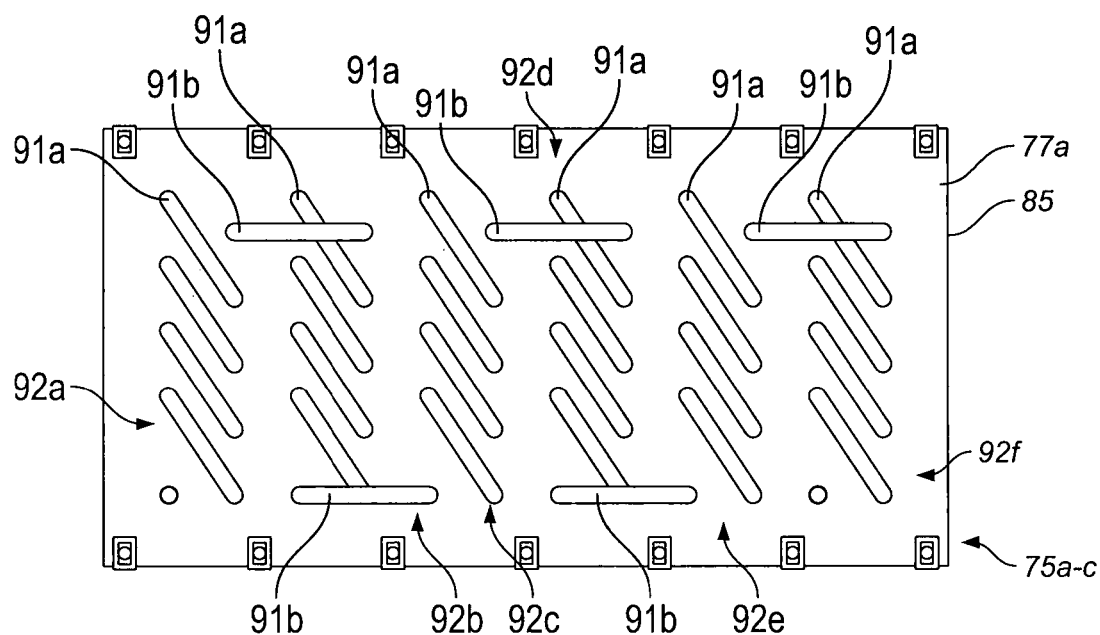
Figure 7E:
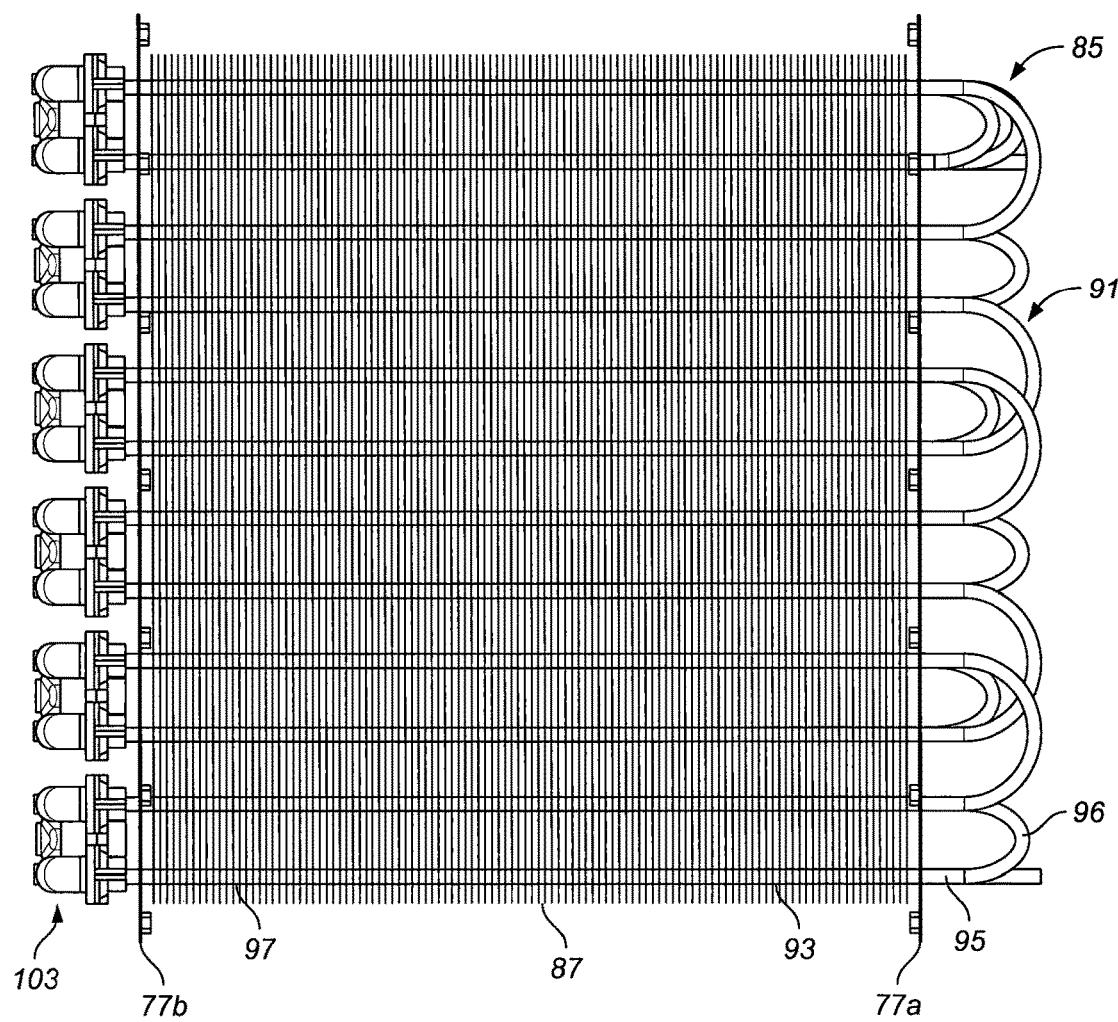
Figure 7F:
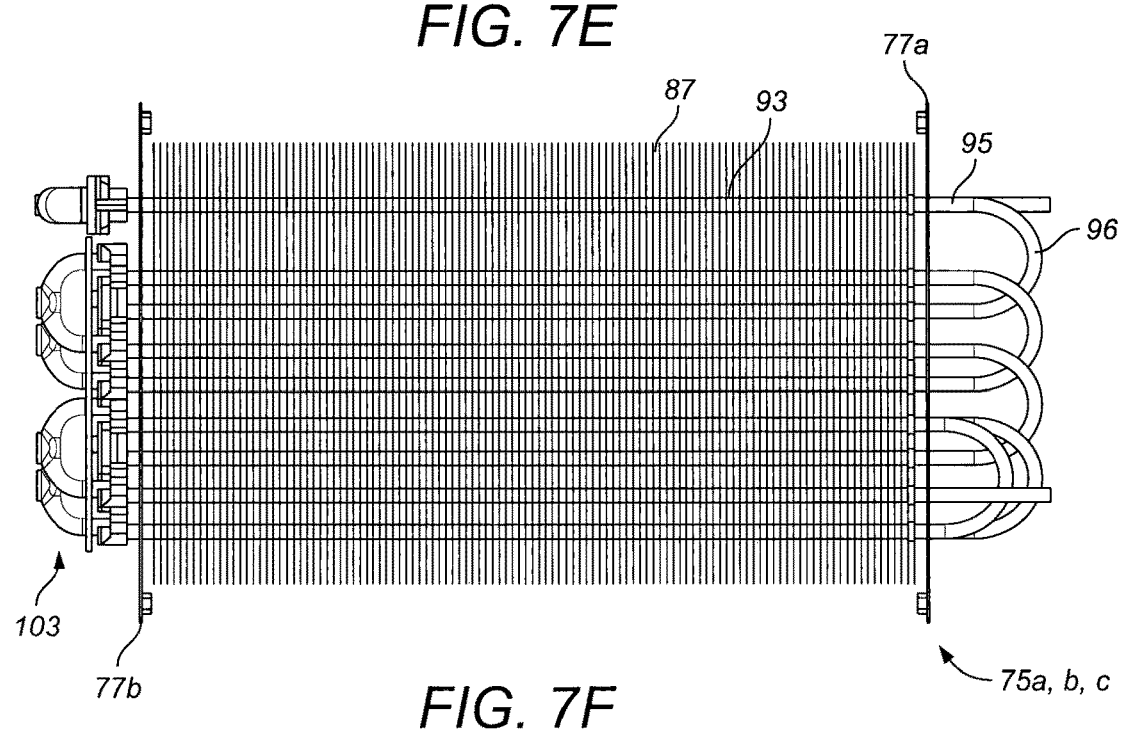
Figure 9A:
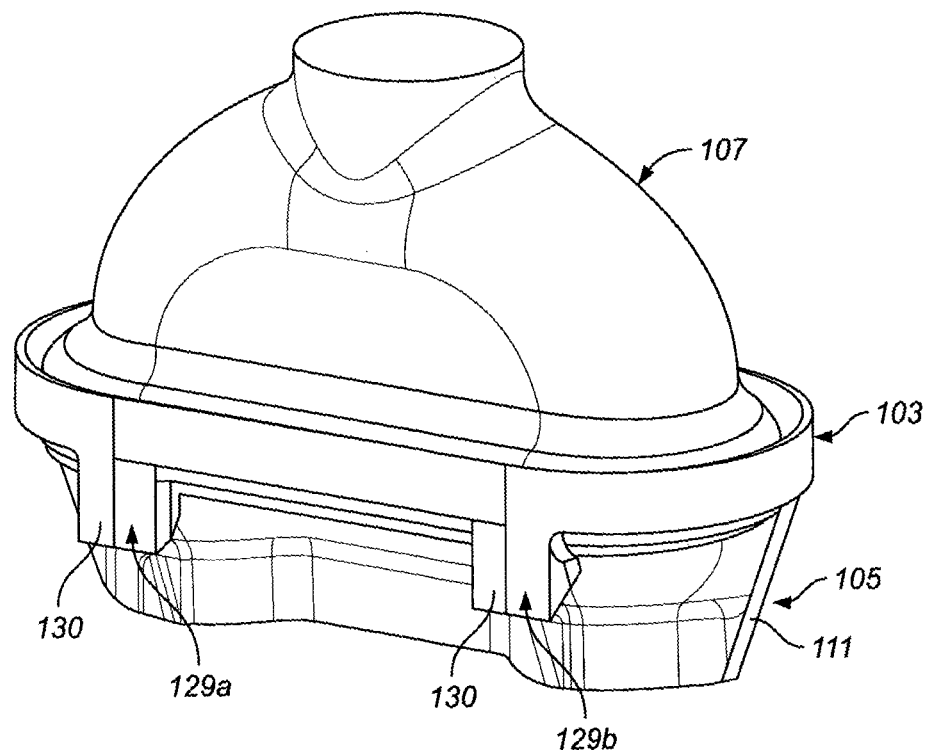
Figure 9B:
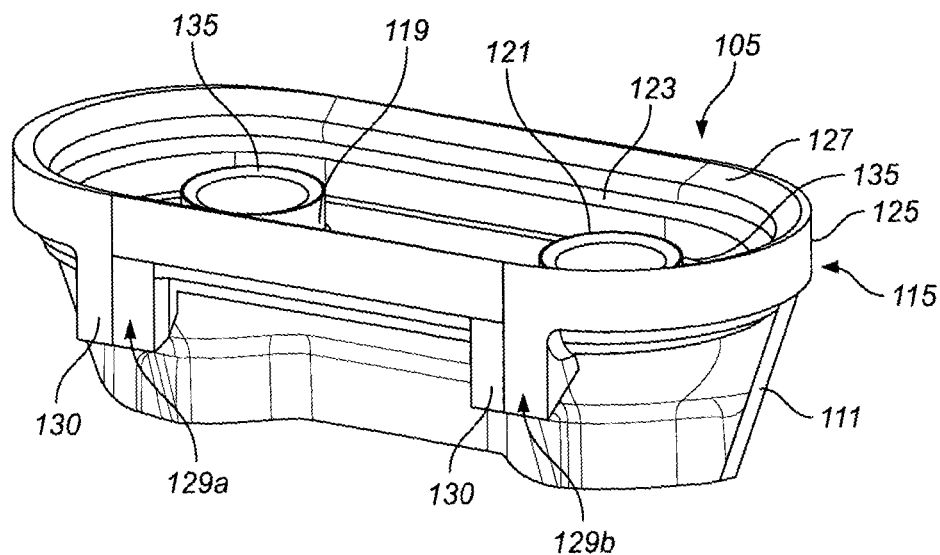
Figure 9C:
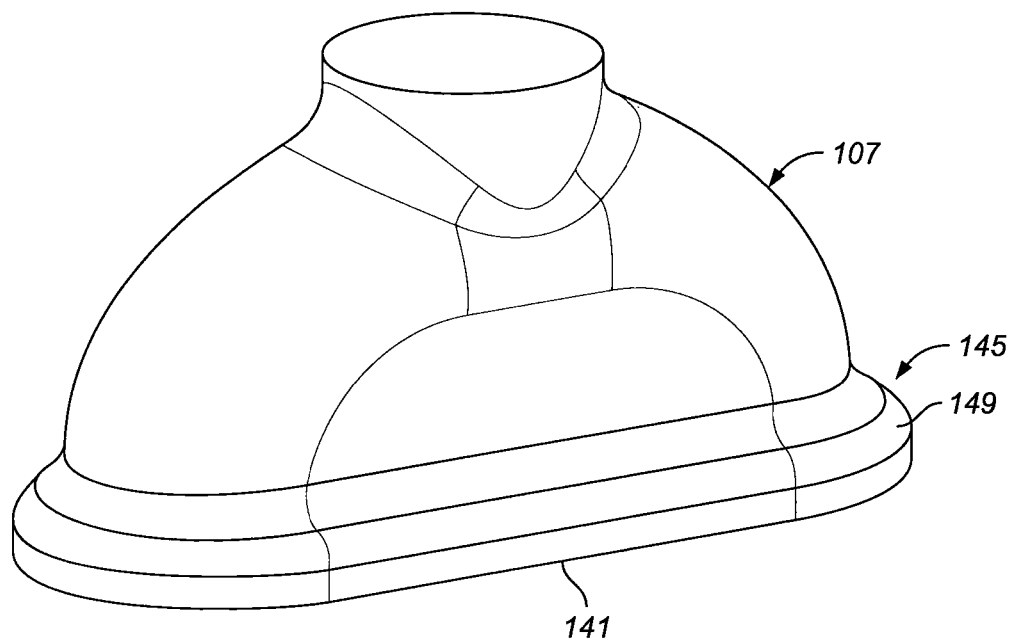
Figure 9D:
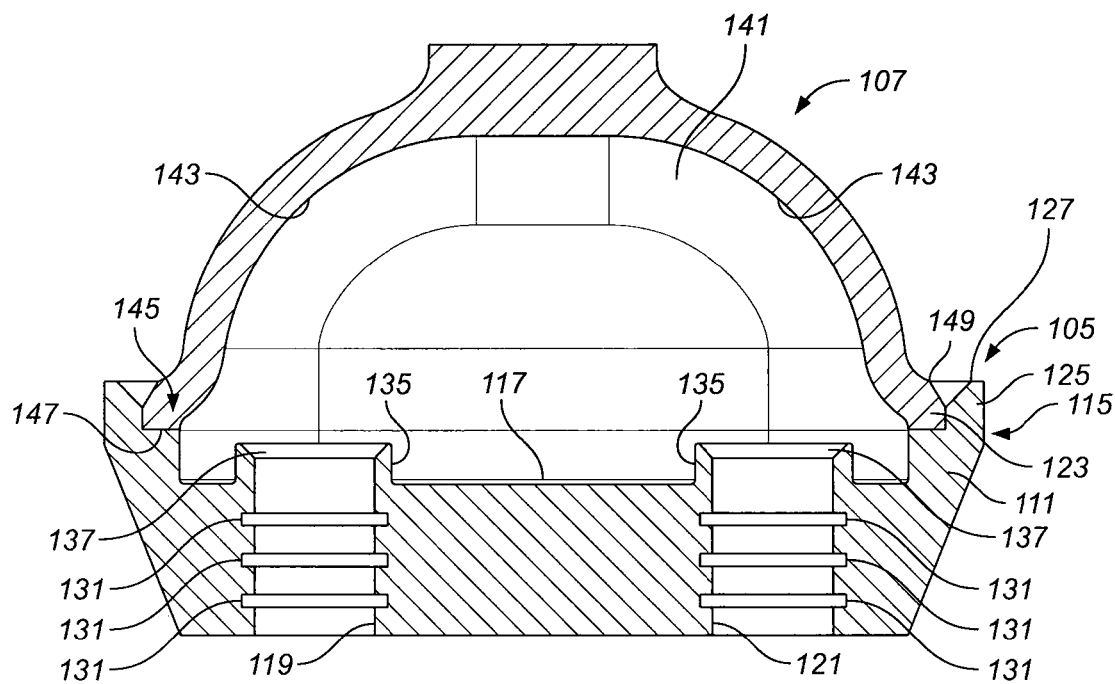
Figure 10A:
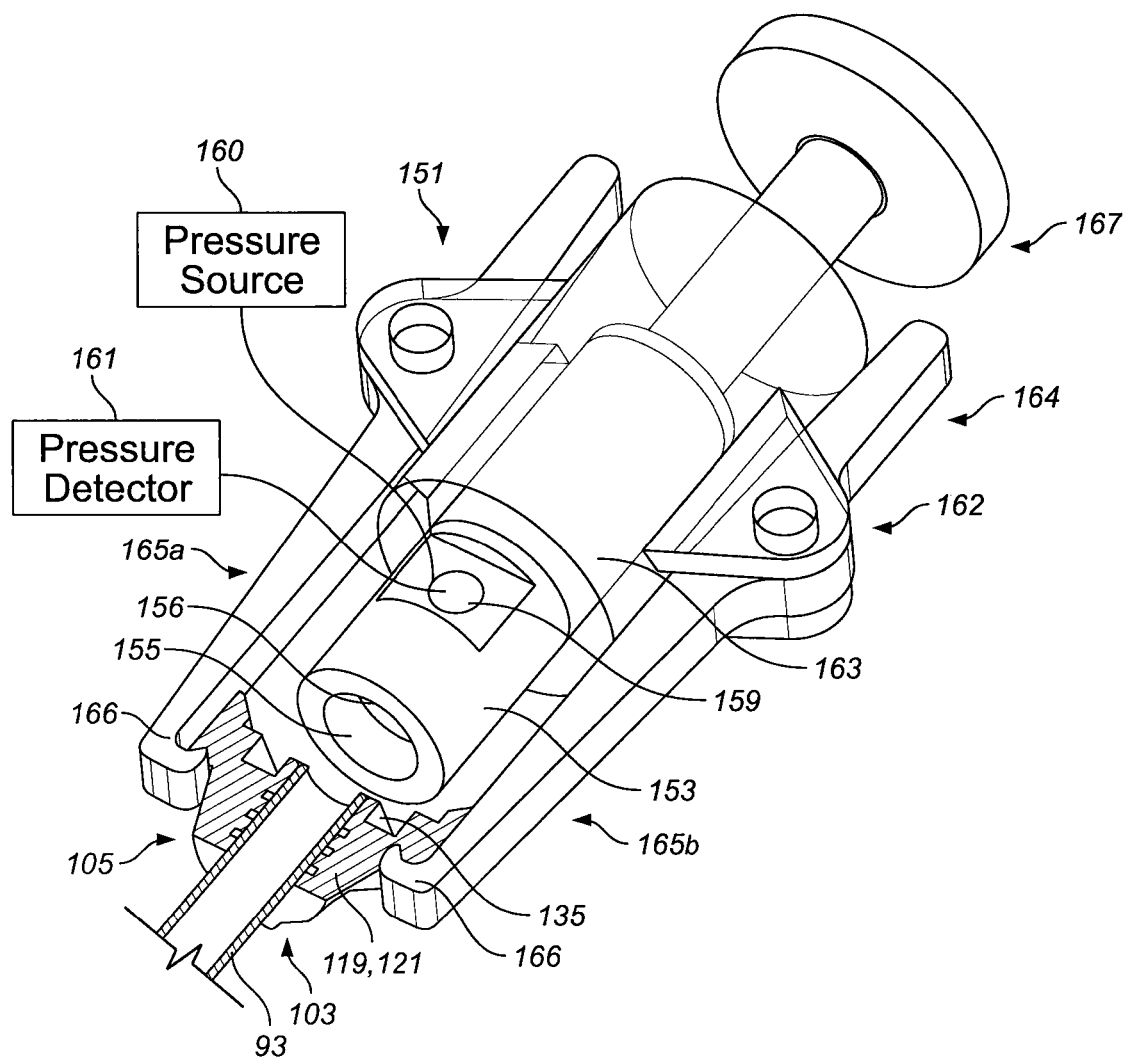
Figure 10B:
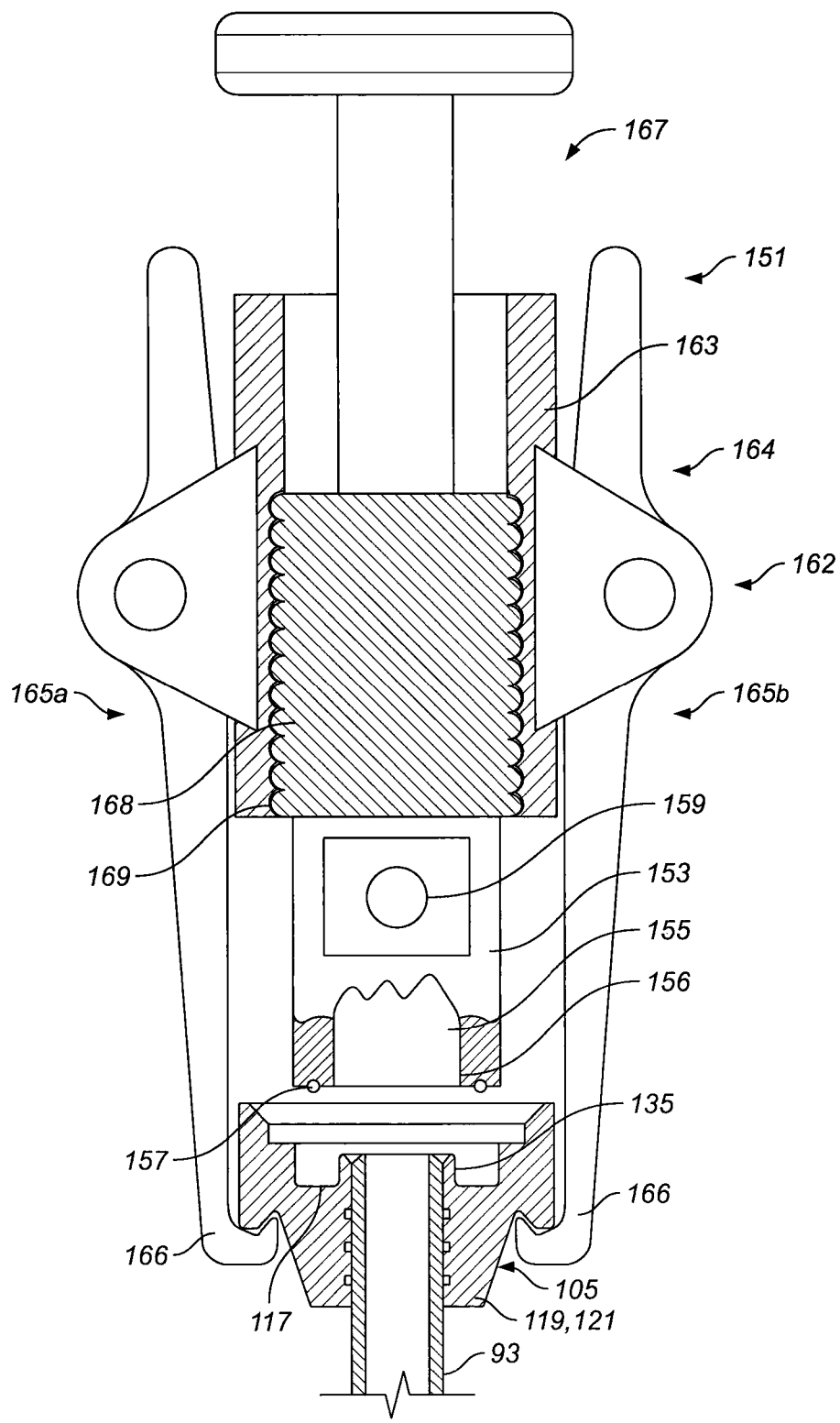
Figure 11:
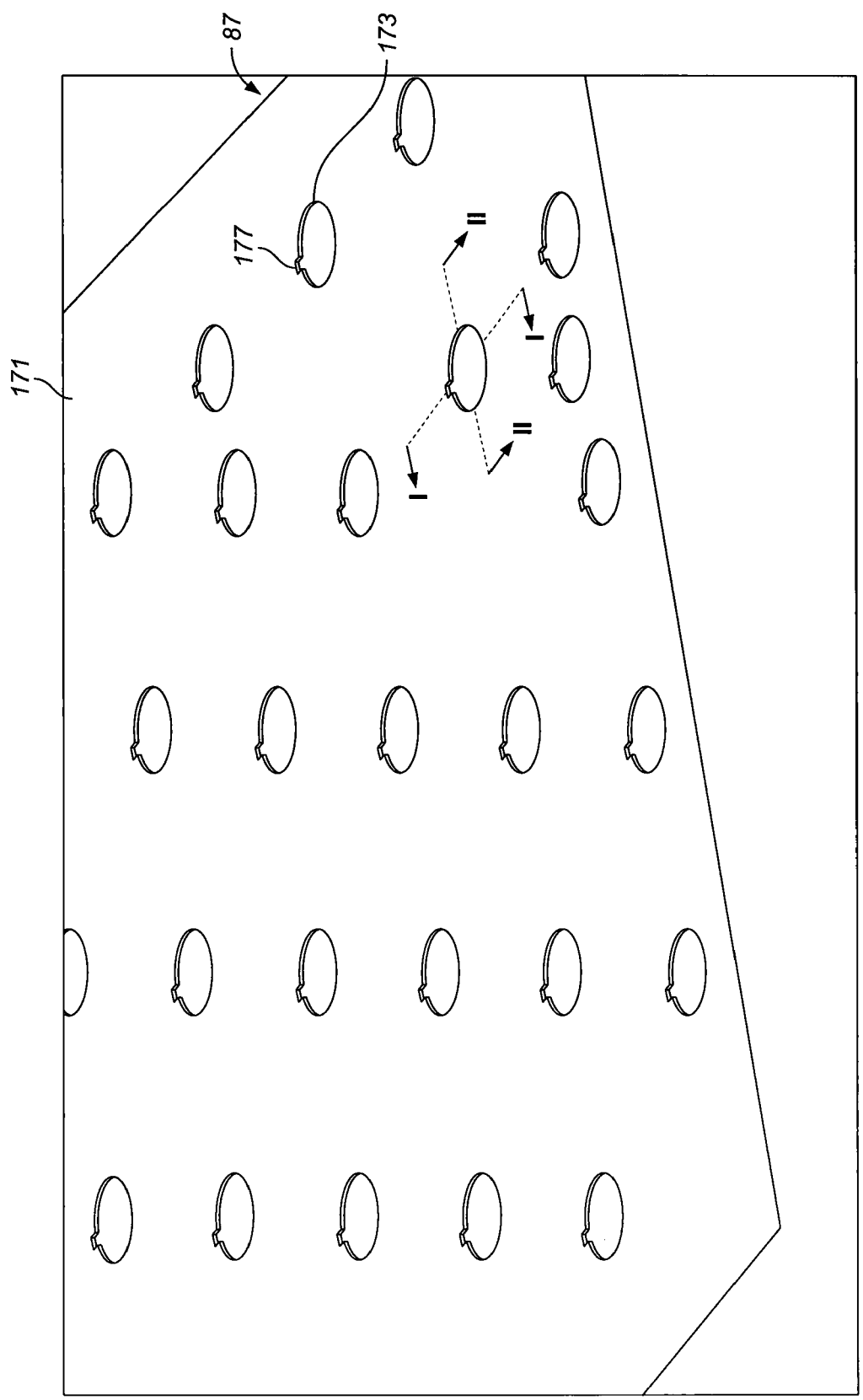
Figure 12A:
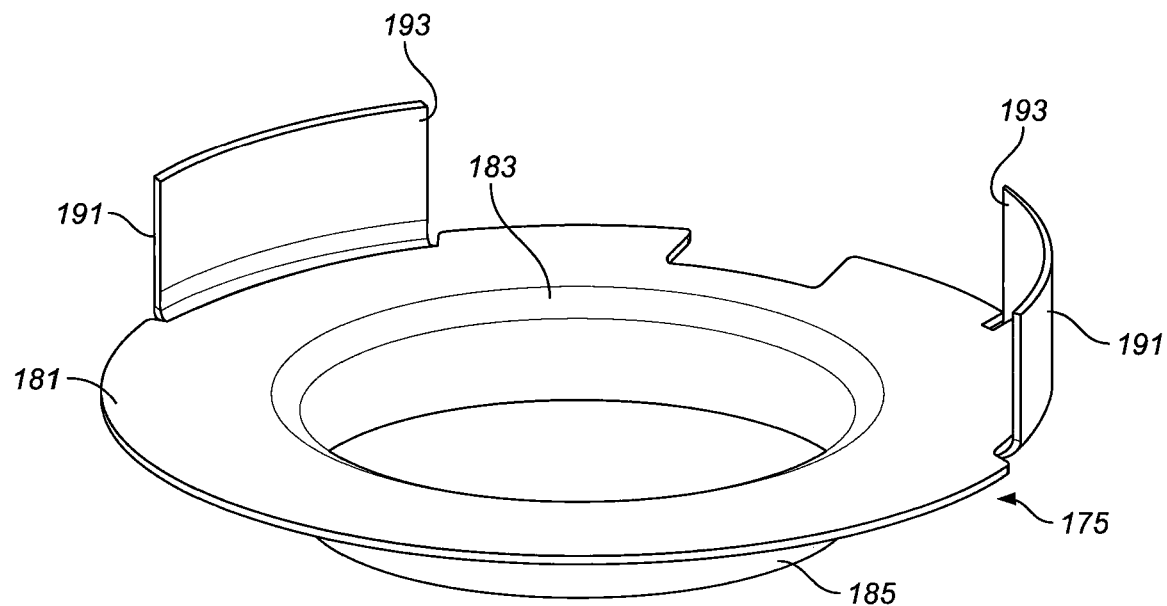
Figure 12B:
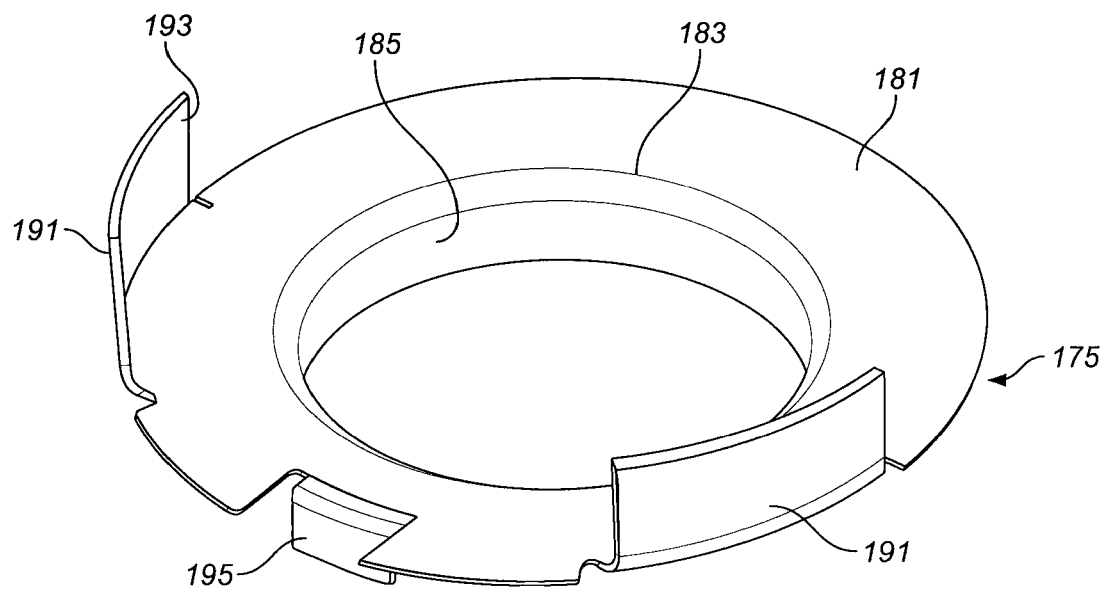
Figure 12C:
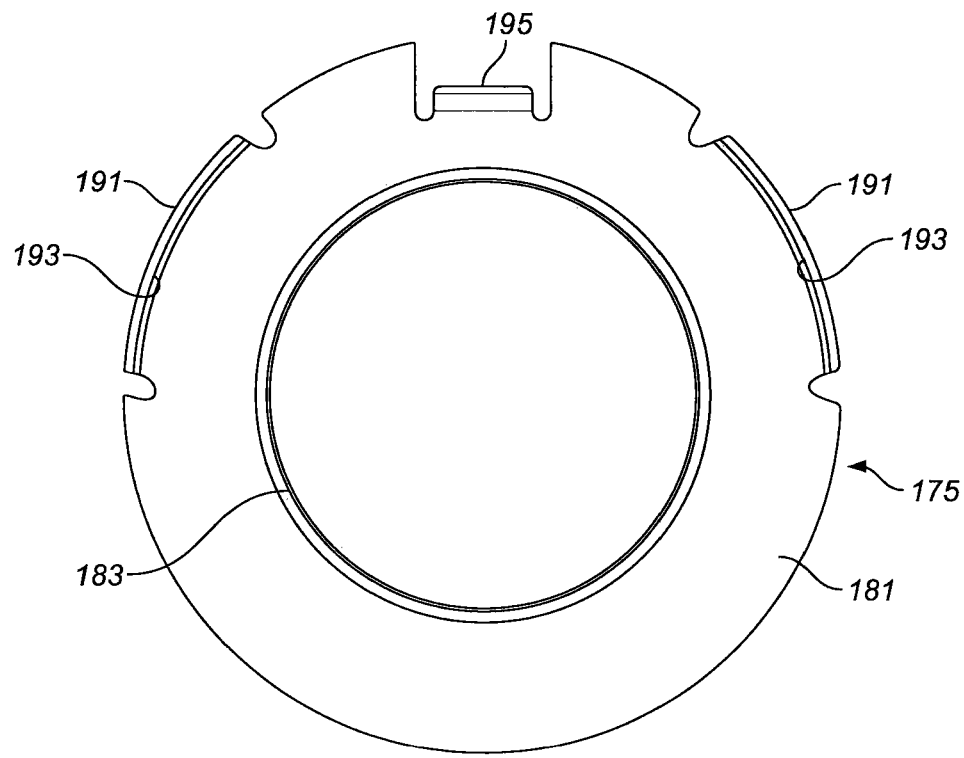
Figure 12D:
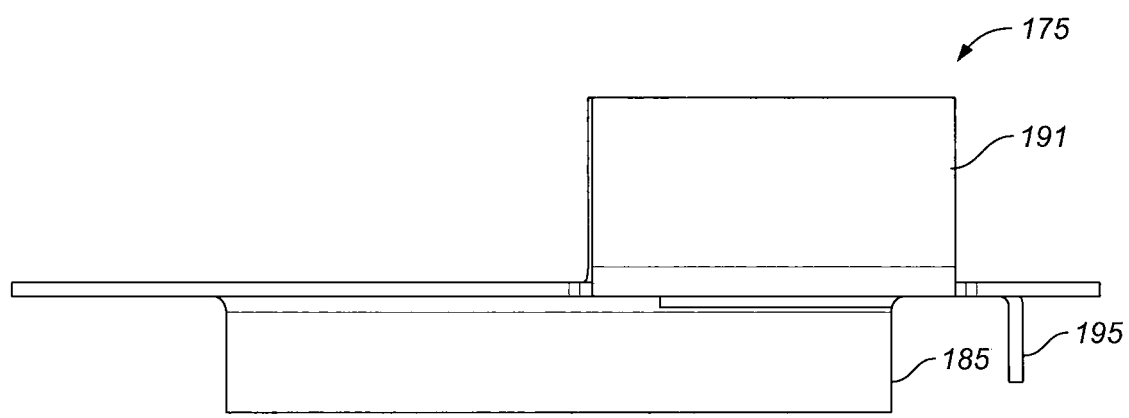
Figure 13:
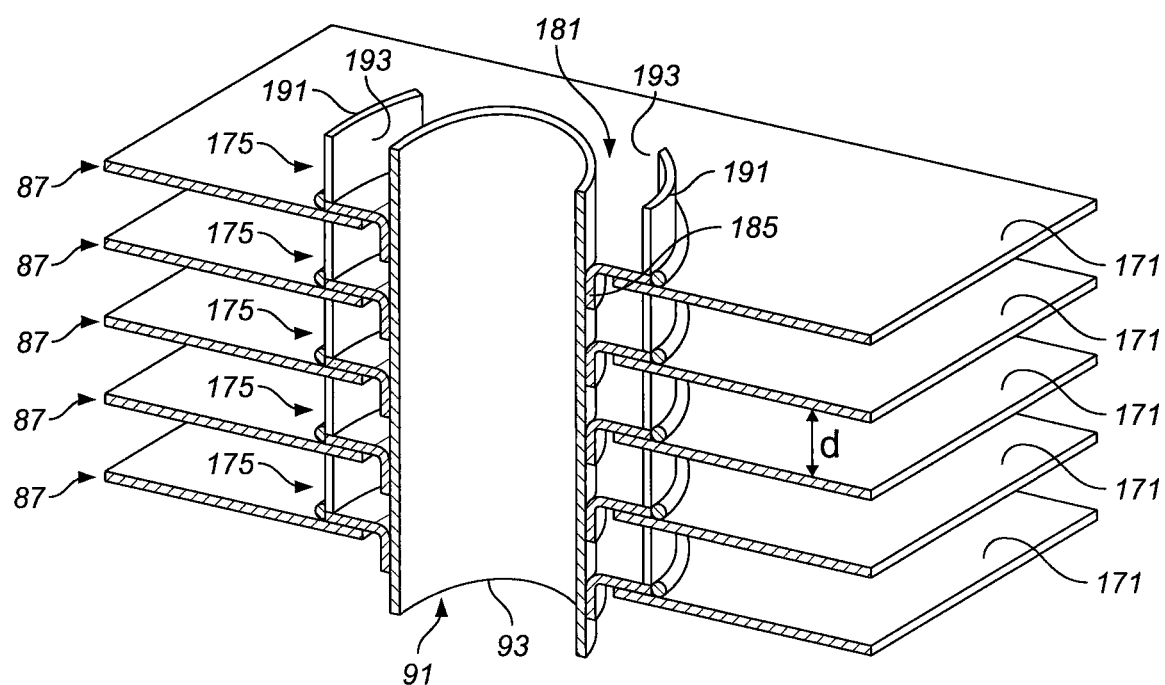
Figure 15A:
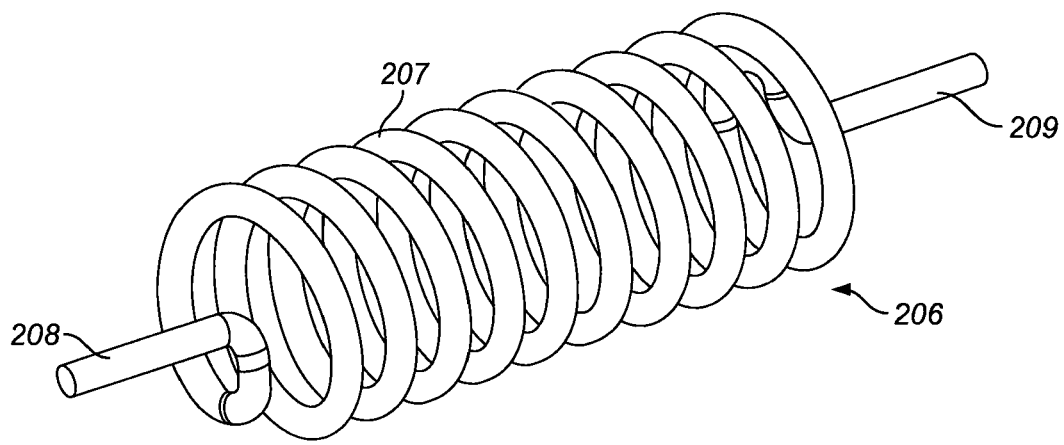
Figure 15B:
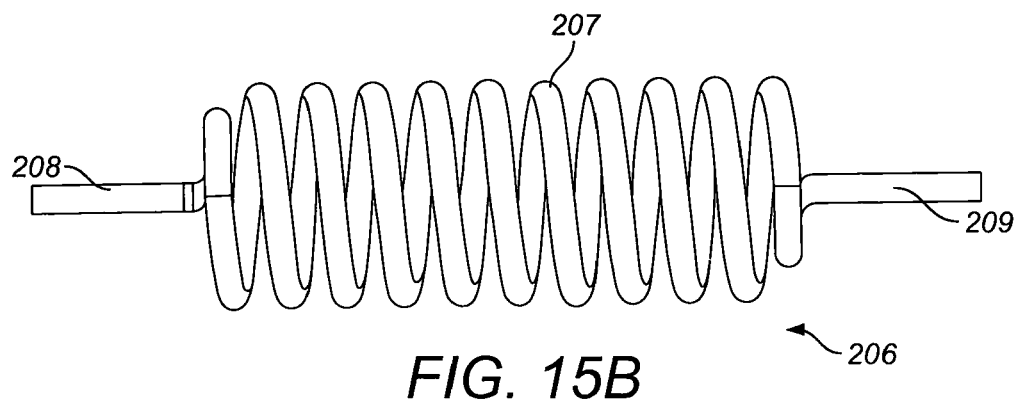
Figure 15C:
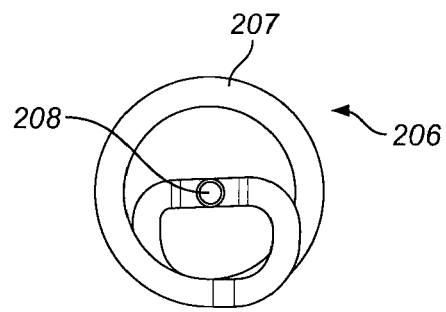

Preferred embodiments of the present invention will now be described hereinbelow by way of example only with reference to the accompanying drawings, in which:

FIGS. 1(a) to (c) schematically represent a power generation system in accordance with a preferred embodiment of the present invention;

FIGS. 2 and 3 illustrate part cut-away perspective views of the steam generator of the power generation system of FIG. 1;

FIGS. 4(a) to (j) illustrate views of the housing of the steam generator of the power generation system of FIG. 1;

FIGS. 5(a) to (g) illustrate views of the steam generation module of the steam generator of the power generation system of FIG. 1;

FIGS. 6(a) to (e) illustrate views of the heat exchanger arrangement of the steam generation module of FIG. 5;

FIGS. 7(a) to (f) illustrate views of one heat exchanger module of the heat exchanger arrangement of FIG. 6;

FIGS. 8(a) to (c) illustrate one U-shaped tube section of the heat exchanger module of FIG. 7;

FIGS. 9(a) to (d) illustrate one pipe end coupling of the heat exchanger module of FIG. 7;

FIGS. 10(a) and (b) illustrate a test tool in accordance with one embodiment of the present invention;

FIG. 11 illustrates a perspective view of the sheet element of one fin of the heat exchanger module of FIG. 7;

FIGS. 12(a) to (d) illustrate views of the fin coupling element of one fin of the heat exchanger module of FIG. 7;

FIG. 13 illustrates a fragmentary, part cut-away perspective view of a plurality of stacked fins of the heat exchanger module of FIG. 7 at the junction with one tube element;

FIGS. 14(a) to (f) illustrate views of the superheater unit of the steam generation module of FIG. 5;

FIGS. 15(a) to (c) illustrate views of one superheater coil of the superheater unit of FIG. 14.

The power generation system comprises a steam generation unit 1 for generating a superheated fluid, in this embodiment superheated steam, from a working fluid, in this embodiment pure, de-mineralised water, at least one, in this embodiment a plurality of steam engines 3a-c which receive the superheated steam from the steam generation unit 1, and at least one, in this embodiment a plurality of power generators 5a-c which are driven by the respective steam engines 3 to generate power, in this embodiment electricity, which can be supplied to the electrical grid.

The steam generation unit 1 comprises a steam generator 11 which receives a stream of heated gas, typically an exhaust gas from a combustion engine, and generates a superheated fluid, in this embodiment superheated steam.

In this embodiment the stream of heated gas has a temperature of from about 425° C. to about 650° C.

In this embodiment the combustion engine is a landfill anaerobic digestion engine or a diesel engine, typically having a power output in the range of from about 0.2 MW to about 3.2 MW.

The steam generation unit 1 further comprises a buffer tank 15 for storing a supply of the working fluid, in this embodiment water, and a pump unit 17 for delivering the water from the tank 15 to the steam generator 11 at a required flow rate and/or pressure.

The steam generation unit 1 further comprises a condenser 21 which receives used steam from the steam engine 3, condenses the used steam to a saturated liquid, in this embodiment water, and delivers the same to the tank 15.

With this configuration, the steam generator 11, the steam engine 3, the condenser 21 and the tank 15 define a circulatory loop through which the working fluid is circulated, in being converted from a saturated liquid, here water, to a superheated fluid, here superheated steam, and back to a saturated liquid.

In this embodiment the steam generation unit 11 further comprises a by-pass valve unit 23, here comprising first and second valves 25a, b, which can be selectively operated between a first, by-pass mode, as illustrated in FIG. 1(b), in which the exhaust gas by-passes the steam generation unit 11 and passes directly through a muffler 27, and a second, operative mode, as illustrated in FIG. 1(c), in which the exhaust gas is delivered through the steam generation unit 11 prior to the muffler 27.

The steam generator 11 comprises a housing 31, which defines a gas flow path 33 and has an inlet 35 at one, upstream end thereof into which a stream of heated gas is delivered and an outlet 37 at the other, downstream end thereof through which the stream of heated gas exits, and a steam generation module 39 which disposed within the gas flow path 33 of the housing 31.

In this embodiment the housing 31 comprises a main housing part 41 and first and second end housing parts 43, 44.

In this embodiment the housing 31 is formed of stainless steel, here having a thickness of 2 mm.

In this embodiment the main housing part 41 has a rectangular internal cross-section.

In this embodiment one of the end housing parts 43 is fixed, here by welding, to the main housing part 41, and the other of the end housing parts 44 is removable from the main housing part 41, in this embodiment by a flange coupling 45, here a bolted flange coupling.

In this embodiment the removable end housing part 44 is at the upstream end of the housing 31, and removal of that end housing part 44 allows for the steam generation module 39 to be loaded into or unloaded from the housing 31.

In this embodiment the main housing part 41 provides a main flow path F1 through a central region thereof, and first and second ancillary flow paths F2 to the respective outer, lateral sides of the steam generation module 39.

In this embodiment the ancillary flow paths F2 receive less than 10% of the gas flow through the housing 31.

In one embodiment the ancillary flow paths F2 receive less than 5% of the gas flow through the housing 31.

In this embodiment the housing 31 includes a support 46 for supporting the steam generation module 39, which is disposed within the main housing part 41 and allows for the steam generation module 39 to be slideably introduced into or withdrawn from the main housing part 41 on removal of the removable end housing part 44.

In this embodiment the support 46 provides rails 47, here first and second rails 47a, b at the respective outer edges thereof, along which the steam generation module 39 is slideable.

In this embodiment the support 46 includes a locator fixture 51, here disposed at one, downstream end of the support 46, for locating one, downstream end of the steam generation module 39, and a locking fixture 53, here disposed at the other, upstream end of the support 46, for locking the steam generation module 39 to the support 46 in a manner which allows for expansion of the steam generation module 39, as will be described in more detail hereinbelow.

In this embodiment the locator fixture 51 comprises first and second locating elements 55a, b, here including locating apertures 56, which are disposed at the downstream ends of the rails 47a, b.

In this embodiment the locking fixture 53 comprises first and second locking elements 57a, b, here including locking apertures 58, which are disposed at the upstream ends of the rails 47a, b.

The steam generation module 39 comprises a pre-heater unit 61 which is operative to raise the temperature of a received working fluid, here water, as a saturated liquid, typically having a temperature of about 70° C., to a temperature of from about 100° C. to about 120° C., and optionally to a temperature of from about 100° C. to about 110° C.

The pre-heater unit 61 comprises at least one pre-heater circuit 63, in this embodiment a plurality of pre-heater circuits 63a-c, which each comprise pre-heating pipework 65, and each has an input fluidly connected to the tank 15 and an output from which the working fluid of raised temperature is delivered.

In this embodiment the pipework 65 of the pre-heater circuits 63a-c extend within and along a lateral side of the main housing part 41, here from one, upstream end of the main housing part 41 to the other, downstream end of the main housing part 41, such as to be heated by one of the ancillary gas flows F2.

In this embodiment the pre-heating pipework 65 is formed of stainless steel tube having an external diameter of 12.7 mm and a 16 swg wall thickness.

The steam generation module 11 further comprises at least one, in this embodiment first and second heat exchanger units 71a, b which are located in series upstream of the pre-heater unit 61, and are operative to raise the temperature of the working fluid as received from the pre-heater unit 61 to a temperature of about 260° C., thereby providing the working fluid as saturated steam.

The heat exchanger units 71a, b each comprise at least one heat exchanger circuit 73, in this embodiment a plurality of heat exchanger circuits 73a-c, which each have an input fluidly connected to a respective one of the pre-heater circuits 63a-c of the pre-heater unit 61 and an output from which the working fluid, as saturated steam, is delivered.

In this embodiment the heat exchanger units 71a, b each comprise at least one heat exchanger assembly 75, in this embodiment a plurality of heat exchanger assemblies 75a-c, which each provide a respective one of the heat exchanger circuits 73a-c and are stacked to provide the respective heat exchanger unit 71a, b.

With this configuration, the heat exchanger assemblies 75a-c of the first and second heat exchanger units 71a, b define an n×m array, here a 2×3 array.

In this embodiment the heat exchanger assemblies 75a-c each have a power output of at least 30 kW, optionally at least 40 kW, with each heat exchanger circuit 73a-c having a power output of at least 60 kW, optionally at least 80 kW, and together provide a total power output at least 180 kW, optionally at least 240 kW.

In this embodiment the heat exchanger assemblies 75a-c each comprise first and second support elements 77a, b which are disposed in spaced relation and define a width of the heat exchanger unit 71a, b.

In this embodiment the support elements 77a, b of the heat exchanger assemblies 75a-c are formed from stainless steel sheet having a thickness of 6 mm.

In this embodiment the support elements 77a, b of the heat exchanger assemblies 75a-c are interconnected by sliding couplings, which allow relative movement of the heat exchanger assemblies 75a-c, thus accommodating relative expansion thereof.

In this embodiment the support elements 77a, b of one, the lowermost, of the heat exchanger assemblies 75a-c each include a rail guide 79 at the lower edge thereof, which overlies a respective one of the rails 47a, b of the support 46 of the housing 31, such as to provide for sliding engagement with the rails 47a, b.

In this embodiment the heat exchanger assemblies 75a-c each comprise heat exchanger pipework 85 which extends between the support elements 77a, b of the heat exchanger assemblies 75a-c, and a plurality of fins 87 which extend in spaced, parallel relation to the support elements 77a, b of the heat exchanger assemblies 75a-c. For purposes of illustration, only some of the fins 87 are illustrated in certain of the views.

In this embodiment the heat exchanger pipework 85 comprises a plurality of bent, U-shaped tube sections 91, which each provide two spaced, parallel elongate tube elements 93, one ends 95 of which are continuously fluidly connected by a 180 degree radiused bend 96, and the other ends 97 of which are open and in spaced relation.

In this embodiment, as illustrated in FIG. 7(*d*), the tube sections 91 comprise first tube sections 91a, which are arranged as a plurality of rows 92a-f, such that the flow of the working fluid is along the rows 92a-f in series, and second, cross-over tube sections 91b, which provide for a cross-over transfer flow between the respective rows 92a-f.

In this embodiment the tube elements 93 of the first tube sections 91a have a closer spacing than the tube elements 93 of the second tube sections 91b.

In this embodiment the rows 92a-f are arranged as vertical rows in spaced relation along a length of the heat exchanger assembly 75a-c, such that the flow is through each row 92a-f, here vertically upwards or downwards, with the flow passing laterally across the heat exchanger assembly 75a-c in alternate directions.

In this embodiment the other, open ends 97 of the tube sections 91 extend to a generally common plane, and the open ends 97 of the tube elements 93 of adjacent tube sections 91 have a common spacing, which allows for fluid connection of the open ends 97 by a single size of tube end coupling 103, as will be described in more detail hereinbelow.

In this embodiment the tube sections 91 are formed of stainless steel tube having an external diameter of 12.7 mm and a 16 swg wall thickness.

In this embodiment the open ends 97 of the tube elements 93 each include an outwardly-inclined internal chamfer 101, here of 45 degrees.

In this embodiment the heat exchanger pipework 85 further comprises a plurality of tube end couplings 103 which fluidly connect the open end 97 of one tube element 93 from each of two adjacent tube sections 91.

With this configuration, the tube sections 91 and the pipe end couplings 103 provide a single, continuous flow path which extends in alternate directions across a width of the heat exchanger assembly 75a-c, and thus the gas flow passage 33 of the housing 31.

In this embodiment the pipe end couplings 103 each comprise a main body part 105 to which the open ends 97 of the adjacent tube sections 91 are fixed, and an enclosure part 107 which is fixed to the main body part 105 and provides a closed fluid connection between the respective open ends 97 of the adjacent tube sections 91.

In this embodiment the main body part 105 comprises a body 111, which includes a flange 115 which encloses a surface 117, and first and second bores 119, 121 which extend to the surface 117, such as to provide fluid communication thereto.

In this embodiment the flange 115 defines an annular seat 123 to which the enclosure part 107 is fixed, and an upstand 125 which extends around the seat 123 and includes an inwardly-inclined internal chamfer 127, here of about 45 degrees.

As will be described in more detail hereinbelow, this configuration allows the enclosure part 107 to be located on the seat 123, and the enclosure part 107 to be fixed to the main body part 105, in this embodiment by providing an annular weld at the junction of the internal chamfer 127.

In this embodiment the main body part 105 includes at least one clamping fixture 129 for engagement by a testing tool 151, as will be described in more detail hereinbelow, here first and second clamping fixtures 129a, b, which are each configured to engage a clamping fixture 164 on the testing tool 151.

In this embodiment the clamping fixtures 129a, b each comprise first and second pairs of detents 130, here lugs, which are disposed to opposite sides of the respective through bores 191, 121.

In this embodiment the through bores 119, 121 each include at least one, here a plurality of grooves 131, into which the open end 97 of a respective one of the tube elements 93 of the adjacent tube sections 91 is expanded, here by swaging.

In this embodiment the through bores 119, 121 each terminate at an upstand 135 which projects from the surface 117 and to which the open end 97 of a respective one of the tube elements 93 of the adjacent tube sections 91 is fixed, here by an annular weld.

In this embodiment the upstand 135 includes an inwardly-inclined internal chamfer 137, here of 45 degrees, which, together with the outwardly-inclined external chamfer 101 on the open end 97 of the respective tube element 93, defines a channel for receiving the weld.

In this embodiment the enclosure part 107 includes an internal cavity 141 which defines an arcuate surface having first and second bend radii 143, which are disposed opposite the through bores 119, 121 in the main body part 105, thereby defining a 180 degree radiused bend between the through bores 119, 121.

In this embodiment the enclosure part 107 includes a flange 145 which extends around the internal cavity 141.

In this embodiment the flange 145 defines an annular seat 147 which corresponds to the annular seat 123 as defined by the flange 115 of the main body part 105, and includes an outwardly-inclined external chamfer 149, here of about 45 degrees.

With this configuration, the enclosure part 107 can be fixed to the main body part 105 by providing an annular weld at the junction of the internal chamfer 127 of the main body part 105 and the external chamfer 149 of the enclosure part 107.

In this embodiment the main body part 105 and the enclosure part 107 are formed of stainless steel.

In this embodiment the main body part 105 and the enclosure part 107 are fabricated by casting, here investment casting, but other fabrication methods could be employed.

FIGS. 10(a) and (b) illustrate a testing tool 151 in accordance with one embodiment of the present invention for pressure testing the fixing of the tube elements 93 to the through bores 119, 121 of the main body parts 105 of the tube end couplings 103.

The testing tool 151 comprises a test body 153, which includes a chamber 155, which, when the testing tool 151 is fitted to the main body part 105 of one tube end coupling 103, is fluidly connected to one through bore 119, 121 of the main body part 105 under test.

In this embodiment the test body 153 includes a first, coupling port 156, here a circular aperture, and a sealing element 157, here an annular seal, which surrounds the coupling port 156, such as to provide for sealing engagement between the chamber 155 and the main body part 105 under test.

In this embodiment the coupling port 156 is shaped and sized to fit over the upstand 135 of one of the through bores 119, 121 of the main body part 105, with the sealing element 157 engaging the surface 117 of the main body part 105.

In this embodiment the test body 153 further includes a pressure connection port 159 which is fluidly connected to the chamber 155 and allows for connection of one or both of a pressure source 160 for delivery of a pressure to the chamber 155 or a pressure detector 161 for detection of a pressure at the chamber 155.

The testing tool 151 further comprises a clamping arrangement 162 for clamping the test body 153 to the main body part 105 under test.

In this embodiment the clamping arrangement 162 comprises a clamp body 163 to which the test body 153 is movably disposed, and a clamping fixture 164 for clamping the clamp body 163, and the test body 153 which is supported thereby, to the main body part 105 under test, here by engagement with one clamping fixture 129a, b on the main body part 105.

In this embodiment the clamping fixture includes a pair of clamping arms 165a, b, which are configured to engage a respective pair of clamping fixtures 129a, b on the main body part 105.

In this embodiment the clamping arms 165a, b are movably disposed to the clamp body 163, here pivotally coupled, and each include a detent 166, here a lug, at one end thereof for engagement with the counterpart detent 130 of the clamping fixture 129a, b of the main body part 105.

In this embodiment the clamping arrangement 162 further comprises a biasing mechanism 167 for biasing the test body 153 relative to the clamp body 163, such as to fix the test body 153 in sealing engagement with the respective through bore 119, 121, here by sealing engagement with the surface 117 of the main body part 105.

In this embodiment the biasing mechanism 167 comprises a drive member 168 which is axially displaceable relative to the clamp body 163, here by a threaded coupling 169 with the clamp body 163, such that rotation of the drive member 168 causes axial displacement of the test body 153. In other embodiments the drive member 168 could be operated by an electrically-operated actuator.

The testing tool 151 further comprises a pressure source 160 which is fluidly connected to the pressure connection 159 of the test body 153, and a pressure detector 161 for providing an indication of the acceptability of the fixing of the tube elements 93 to the through bores 119, 121 of the main body part 105 under test.

With this configuration of the main body part 105 of the tube end coupling 103, and, through use of the testing tool 151, the acceptability of the fixing of each main body part 105 can be assured before completing the tube end coupling 103 by fixing, here welding, the enclosure part 107 to the respective main body part 105.

Referring particularly to FIGS. 11 to 13, in this embodiment the fins 87 each comprise a single, continuous sheet element 171, which includes a plurality of apertures 173 through which extend respective ones of the tube elements 93 of the tube sections 91 of the respective heat exchanger assembly 75a-c, and a plurality of fin coupling elements 175 which are located within each aperture 173 to interface the tube elements 93 of the tube sections 91 to the sheet elements 171, as will be described further hereinbelow.

By forming the fins 87 from a single, continuous sheet element 171, a uniform temperature distribution can be promoted over the length of the heat exchanger assembly 75a-c, in the sense of the flow direction of the heated gas flow through the housing 31.

In this embodiment the sheet element 171 is formed from stainless steel sheet having a thickness of 1 mm.

In this embodiment the apertures 173 each include a locator 177, here a cut-out, which acts to locate the rotational position of the respective fin coupling element 175 within the aperture 173.

In this embodiment the fin coupling elements 175 each comprise a body part 181 which is thermally connected to the sheet element 171 and includes an aperture 183 through which extends a respective one of the tube elements 93, and a flange 185 which extends from the body part 181 and around the aperture 183 therein and through the respective aperture 173 in the sheet element 171, and is thermally connected to the respective tube element 93.

In this embodiment the flange 185 comprises a tubular section, here having a length of at least 3 mm, which is a close fit to the outer diameter of the tube elements 93 of the tube sections 91.

By utilizing fin coupling elements 175 of the kind as described, fitting of the sheet elements 171 to the tube elements 93 of the tube sections 91 is facilitated, as the apertures 173 in the sheet elements 171 can be made greater than the outer diameter of the tube elements 93, which allows for relatively-free movement of the sheet elements 171 over the array of tube elements 93 to the required positions along the axial length of the tube elements 93, with fitting of the fin coupling elements 175 to a respective sheet element 171 only being required when the sheet element 171 is in the required axial position.

In addition, with this configuration, the flange 185, which is a close fit to the respective tube element 93, can have an extended length, which promotes thermal transfer between the tube element 93 and the sheet element 171.

In this embodiment the body part 181 has the form of a flat, annular part, in the manner of a thin washer, and the flange 185 extends in one direction orthogonally thereto.

In this embodiment the fin coupling elements 175 each further comprise at least one, here a plurality of projections 191 which extend in an opposite direction to the flange 185.

In this embodiment the projections 191 each comprise an upstand which extends in an opposite direction to the flange 185, and act to support the adjacent sheet element 171, as will be described in more detail hereinbelow.

With this configuration, the spacing d of the sheet elements 171 is set by the length of the projections 191, thus allowing the spacing d of the sheet elements 171 to be precisely controlled.

In this embodiment the projections 191 extend from an outer peripheral edge of the body part 181, which is spaced radially from the flange 185.

In this embodiment the projections 191 are located to one, rear side of the fin coupling element 175, in the sense of the gas flow direction through the housing 31, and present a forwardly-facing surface 193 which acts to disrupt the gas flow to the rear side of the respective tube element 93, here by causing a vortical flow, which is such as to promote heat transfer between the gas flow and the respective tube element 93.

In this embodiment the fin coupling element 175 includes a locator 195, here a lug, which is configured to locate with the locator 177 in the respective aperture 173 in the sheet element 171 of the fin 87, thereby locating the rotational position of the respective fin coupling element 175 within the aperture 173, and ensuring that the projections 191 on the fin coupling element 175 are located in the required orient relative to the tube element 93 as to promote heat transfer.

In one embodiment the fin coupling element 175 could be coated at least partially with a brazing material, which allows for brazing of the fin coupling elements 175 to the tube elements 93 and the sheet element 171, thus avoid brazing material having to be provided separately where the fixing of the coupling elements 175 is by brazing.

In one embodiment the fin coupling elements 175 are formed of stainless steel and coated with brazing material, in one embodiment with a thickness of less than 0.5 mm, optionally less than 0.3 mm, optionally less than 0.2 mm. In one embodiment the coating has a thickness of about 0.1 mm.

In one embodiment the coating of brazing material is of pure, oxygen-free copper.

In this embodiment the heat exchanger assemblies 75a-c are manufactured as follows.

In a first step, one support element 77a is located in a jig.

In a second step, the tube sections 91 are in turn located in the jig and arranged such that the tube elements 93 thereof extend in a required pattern through the apertures in the one support element 77a, and such that the bends 96 of the tube sections 91 are located outwardly, here downwardly, of the one support element 77a, with the elongate tube elements 93 of the tube sections 91 extending in parallel relation upwardly from the one support element 77a.

In a third step, a fin coupling element 175 is located over each of the tube elements 93. This fin coupling element 175 acts as a spacer to space the first sheet element 171 from the one support element 77a.

In a fourth step, a ring of brazing material, which has an internal diameter corresponding to the outer diameter of the tube elements 93, is located over each of the tube elements 93 so as to be positioned at the aperture 183 in the body part 181 of the fin coupling element 175. In this embodiment the ring of brazing material is formed of pure, oxygen-free copper.

In a fifth step, a ring of brazing material, which has an internal diameter corresponding to the outer diameter of the body part 181 of the fin coupling element 175, is located over each of the fin coupling elements 175 so as to be positioned at the junction of the body part 181 of the fin coupling element 175 and the sheet element 171. In this embodiment the ring of brazing material is formed of pure, oxygen-free copper.

In a sixth step, a sheet element 171 is located over the tube elements 93, by passing the tube elements 93 through the respective apertures 173 in the sheet element 171. As the apertures 173 in the sheet element 171 have a greater diameter than the outer diameter of the tube elements 93, the sheet element 171 can be fitted relatively easily over the tube elements 93.

In a seventh step, a fin coupling element 175 is located over each of the tube elements 93, and the flange 185 of the fin coupling element 175 is located in the respective aperture 173 in the sheet element 171, with the locator 195 of the fin coupling element 175 being located in the locator 177 of the respective aperture 173 in the sheet element 171.

In an eighth step, a ring of brazing material, which has an internal diameter corresponding to the outer diameter of the tube elements 93, is located over each of the tube elements 93 so as to be positioned at the aperture 183 in the body part 181 of the fin coupling element 175. In this embodiment the ring of brazing material is formed of pure, oxygen-free copper.

In a ninth step, a ring of brazing material, which has an internal diameter corresponding to the outer diameter of the body part 181 of the fin coupling element 175, is located over each of the fin coupling elements 175 so as to be positioned at the junction of the body part 181 of the fin coupling element 175 and the sheet element 171. In this embodiment the ring of brazing material is formed of pure, oxygen-free copper.

The sixth to ninth steps are then repeated to build up a stack of fins 87 along the length of the tube elements 93.

In a tenth step, the other support element 77b is located over the tube elements 93, by passing the tube elements 93 through the respective apertures in the other support element 77b.

In an eleventh step, this core assembly is vacuum brazed, which provides a very strong rigid matrix, with each of the tube elements 93 being fixed to each of the sheet elements 171, and the sheet elements 171 having a pre-defined spacing d.

In a twelfth step, the pipe end couplings 103 are attached to the open ends 97 of the tube elements 93 of respective pairs of adjacent tube sections 91.

In this embodiment each pipe end coupling 103 is attached as follows.

In a first sub-step, the main body part 105 of each pipe end coupling 103 is located over the open ends 97 of the tube elements 93 of adjacent tube sections 91, such that the open ends 97 of the tube elements 93 extend into the through bores 119, 121 in the main body part 105, and the open ends 97 of the tube elements 93 are expanded, in this embodiment by from about 4% to about 5%, such as to engage the grooves 131 in the respective through bores 119, 121.

In a second sub-step, the open ends 97 of the expanded tube elements 93 are each fixed to the respective upstands 135 of the through bores 119, 121, here by providing a weld in the channel defined by the external chamfer 101 on the open end 97 of the tube element 93 and the internal chamfer 137 in the upstand 135 of the respective through bore 119, 121.

In a third sub-step, the tube elements 93 are further expanded, in this embodiment by from about 4% to about 5%, such as further to engage the grooves 131 in the respective through bores 119, 121.

In a fourth sub-step, the effectiveness of the coupling of the tube elements 93 to the main body part 105 is tested using the testing tool 151, in the manner as described above.

In a fifth sub-step, where an effective coupling of the tube elements 93 to the main body part 105 is determined, the enclosure part 107 of the pipe end coupling 103 is fixed to the main body part 105, in this embodiment by providing an annular weld at the junction of the internal chamfer 127 of the main body part 105 and the external chamfer 149 of the enclosure part 107.

As discussed hereinabove, in one alternative embodiment, the fourth, fifth, eighth and ninth steps can be omitted where the fin coupling elements 175 are pre-coated with brazing material.

The steam generation module 11 further comprises a superheater unit 201 which is located at an upstream end thereof and upstream of the at least one heat exchanger unit 71a, b, and is operative further to raise the temperature of the received working fluid, in this embodiment saturated steam, to a temperature of from about 300° C. to about 400° C., preferably at a temperature of about 350° C., and with a pressure of up to 60 bar, thereby providing superheated fluid.

The superheater unit 201 comprises at least one superheater circuit 203, in this embodiment a plurality of superheater circuits 203a-c, which each comprise superheater pipework 205, and each has an input fluidly connected to the output of a respective one of the heat exchanger circuits 75a-c and an output from which a superheated fluid, in this embodiment superheated steam, is delivered.

In this embodiment the superheater pipework 205 comprises a plurality of coils 206, which accommodate longitudinal and lateral expansion.

In this embodiment, as illustrated in FIGS. 15(a) to (c), the superheater coils 206 comprise a coil element 207, here a helically-wound coil, having an inlet 208 and an outlet 209, which are located on the longitudinal axis thereof.

In this embodiment the coil element 207 is wound about the longitudinal axis.

With this symmetric configuration, the spring force caused by expansion of the coil 206 is uniform.

In this embodiment the coils 206 comprise slip couplings 210, here in the form of sleeves, which shroud the inlet 208 and the outlet 209 of the coil element 207, such as to protect the coil element 207 from frictional engagement with support elements 211a, b.

In this embodiment the superheater unit 201 comprises first and second support elements 211a, b which support the superheater pipework 205 of the superheater circuits 203a-c and are disposed in spaced relation and define a width of the superheater unit 201.

In this embodiment the support elements 211a, b each include a rail guide 215 at the lower edge thereof, which overlies a respective one of the rails 47a, b of the support 46 of the housing 31, such as to provide for sliding engagement with the rails 47a, b.

In this embodiment the support elements 211a, b of the superheater unit 201 are formed from stainless steel sheet having a thickness of 6 mm.

In this embodiment the support elements 211a, b of the superheater unit 201 have the same spacing as the support elements 77*a, b* of the heat exchanger assemblies 75*a-c* of the at least one heat exchanger unit 71*a, b*.

In this embodiment, as illustrated in FIGS. 14(*a*) to (*f*), the coils 206 of the superheater circuits 203*a-c* extend in spaced, parallel relation between the support elements 211*a, b*.

In this embodiment the superheater pipework 205 is formed of stainless steel tube having an external diameter of 19.05 mm and a wall thickness of 1.65 mm.

In this embodiment the steam generation module 11 further comprises a pressure-relief valve (not illustrated) which provides for venting of the steam generation module 11 in the event of the system pressure exceeding a predetermined threshold, here 65 bar. In this embodiment the pressure relief valve is located downstream of the superheater unit 201.

Finally, it will be understood that the present invention has been described in its preferred embodiments and can be modified in many different ways without departing from the scope of the invention as defined by the appended claims.

The invention claimed is:

1. A steam generator for generating a superheated fluid from a working fluid using a stream of heated gas, the steam generator comprising:
   a housing which defines a gas flow path having an inlet at one, upstream end thereof into which a stream of heated gas is delivered and an outlet at another, downstream end thereof; and
   a steam generation module which is disposed within the gas flow path of the housing, the steam generation module comprising:
      a heat exchanger which comprises at least one heat exchanger circuit which includes heat exchanger pipework having an input and an output, wherein the input of the heat exchanger pipework receives a working fluid and the heat exchanger is operative to raise the temperature of the working fluid to provide a saturated fluid, and
      a superheater unit which comprises at least one superheater circuit, which includes superheater pipework having an input and an output, wherein the input of the superheater pipework receives the saturated fluid from the heat exchanger and the superheater unit is operative to raise the temperature of the saturated fluid and provide a supersaturated fluid;
   wherein the heat exchanger comprises a modular array of a plurality of interconnected heat exchanger units which are provided in at least one heat exchanger assembly, wherein the modular array comprises a plurality of heat exchanger units disposed along a length of the gas flow path; and
   wherein each heat exchanger unit comprises tube elements which extend in spaced relation, a plurality of fins which extend in spaced relation orthogonally to the tube elements and a plurality of pipe end couplings which each fluidly connect open ends of an adjacent pair of the tube elements;
   wherein the pipe end couplings each comprise a main body part to which the open ends of the adjacent pair of the tube elements are fixed, and an enclosure part which is fixed to the main body part and provides a closed fluid connection between the open ends of the adjacent pair of the tube elements;
   wherein the main body part includes an annular seat to which the enclosure part is fixed by an annular weld; wherein the main body part and the enclosure part are fabricated by casting, and
   wherein the enclosure part includes an internal cavity that defines an arcuate surface.

2. The steam generator of claim 1, wherein the stream of heated gas has a temperature of from about 425° C. to about 650° C.

3. The steam generator of claim 1, wherein the stream of heated gas is an exhaust gas from a burner, a biomass burner, a combustion engine, a landfill anaerobic digestion gas engine, a methane burning engine, a diesel engine, a marine engine or a coal gas engine.

4. The steam generator of claim 1, wherein the housing comprises a main housing part which provides a gas flow path therethrough and first and second end housing parts.

5. The steam generator of claim 4, wherein the main housing part provides a main gas flow path through a central region thereof and first and second ancillary gas flow paths to outer, lateral sides of the steam generation module.

6. The steam generator of claim 4, wherein one of the end housing parts is fixed to the main housing part and the other of the end housing parts is removable from the main housing part, whereby the steam generation module is slideably loadable into and unloadable from the main housing part.

7. The steam generator of claim 4, wherein the housing includes a support which is disposed within the main housing part thereof, and allows for the steam generation module to be slideably loaded into and unloaded from the main housing part.

8. The steam generator of claim 1, wherein the heat exchanger is operative to raise the temperature of the received working fluid and provide a saturated fluid at a temperature of at least about 250° C.

9. The steam generator of claim 1, wherein the heat exchanger comprises a plurality of heat exchanger circuits.

10. The steam generator of claim 9, wherein the heat exchanger units are connected in series to provide the plurality of heat exchanger circuits.

11. The steam generator of claim 1, wherein the superheater unit is operative to provide a superheated fluid at a temperature of at least about 300° C., and a pressure of from about 10 bar to about 60 bar.

12. The steam generator of claim 1, wherein the superheater unit comprises a plurality of superheater circuits.

13. The steam generator of claim 1, wherein the steam generation module further comprises a pre-heater unit which comprises at least one pre-heater circuit which includes pre-heater pipework having an input and an output, wherein the pre-heater unit is operative to raise the temperature of a working fluid, and the output of the pre-heater pipework is fluidly connected to the input of the heat exchanger pipework.

14. The steam generator of claim 13, wherein the steam generation module further comprises an economizer which is disposed downstream of the housing.

15. A steam processing unit, comprising:
   the steam generator of claim 1 for providing a superheated fluid; and
   a processing station which receives and utilizes the superheated fluid generated by the steam generator.

16. The steam processing unit of claim 15, wherein the processing station comprises at least one steam engine which receives and is driven by the superheated fluid generated by the steam generator.

17. The steam processing unit of claim 15, wherein the processing station comprises at least one heat treatment unit or a pasteurizing unit which utilizes the superheated fluid generated by the steam generator to treat material.

18. The steam processing unit of claim 15, further comprising:
- a buffer tank for storing a supply of the working fluid;
- a pump unit for delivering the working fluid from the buffer tank to the steam generator; and
- a condenser which receives used working fluid, condenses the used working fluid to a saturated liquid, and delivers the same to the buffer tank.

19. A power generation system, comprising:
- the steam processing unit of claim 15, wherein the processing station comprises at least one steam engine; and
- at least one power generator or electrical power generator which is driven by the at least one steam engine.

20. The steam generator of claim 5, wherein the ancillary flow paths receive less than 10% or less than 5% of the gas flow through the housing.

21. The steam generator of claim 9, wherein the superheater unit comprises a plurality of superheater circuits and the inputs of the superheater pipework are fluidly connected to the outputs of the heat exchanger pipework.

\* \* \* \* \*